United States Patent
Watanabe

(10) Patent No.: US 6,384,579 B2
(45) Date of Patent: May 7, 2002

(54) CAPACITOR CHARGING METHOD AND CHARGING APPARATUS

(75) Inventor: Kiyomi Watanabe, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 09/891,924

(22) Filed: Jun. 26, 2001

(30) Foreign Application Priority Data

| Jun. 27, 2000 | (JP) | 2000-193063 |
| Aug. 21, 2000 | (JP) | 2000-249159 |
| Oct. 12, 2000 | (JP) | 2000-311623 |
| Dec. 25, 2000 | (JP) | 2000-392341 |

(51) Int. Cl.$^7$ .................................................. H02J 7/00
(52) U.S. Cl. ...................................................... 320/166
(58) Field of Search ................................. 320/166, 167, 320/137, 162

(56) References Cited

FOREIGN PATENT DOCUMENTS

| JP | 06-240928 | 4/1996 |
| JP | 06-267927 | 5/1996 |
| JP | 08-082195 | 10/1997 |
| JP | 08-122095 | 11/1997 |
| JP | 08-125255 | 12/1997 |
| JP | 08-201388 | 2/1998 |
| JP | 08-270466 | 5/1998 |
| WO | WO 99/31773 | 6/1999 |

*Primary Examiner*—Gregory Toatley
(74) *Attorney, Agent, or Firm*—Hoffmann & Baron, LLP

(57) ABSTRACT

The charging apparatus charges a load capacitor to a predetermined voltage, and comprises an inverter which is connected to a dc power, a transformer which is connected to the ac side of the inverter, and an inductance which is connected in series to the primary and secondary windings of the transformer and comprises leakage inductance of the transformer, a rectifier which is connected to the secondary side of the transformer, and a switch element which is provided on the secondary side of the transformer. The inverter comprises a switching semiconductor element, connected to the dc power, and a feedback diode, connected in reverse parallel to the switching semiconductor element. The switching element short-circuits the output of the inductance when the charge voltage of the load capacitor has reached a predetermined value, preventing an inertial current, generated by energy which has accumulated in the inductance, from flowing to the load capacitor.

38 Claims, 22 Drawing Sheets

(1) CURRENT IL OF INDUCTANCE CIRCUIT 5

(2) CHARGE VOLTAGE Vc OF LOAD CAPACITOR 8

(3) GATE SIGNALS VgA AND VgB OF SEMICONDUCTOR SWITCHING ELEMENTS 4A TO 4D, AND GATE SIGNAL VgS OF SWITCHING ELEMENT 22

(1) CURRENT IL (IS) OF INDUCTANCE CIRCUIT 5

(2) CHARGE VOLTAGE Vc OF LOAD CAPACITOR 8

(3) COMPARE VOLTAGE Vh AND GATE SIGNAL VgS OF SWITCHING ELEMENT 22

(1) ENLARGED VIEW OF FINAL PERIOD OF COMPARE SIGNAL Vh (2) ENLARGED VIEW OF INTERSECTION BETWEEN CHARGE CURRENT ic AND CURRENT Ic (3) ENLARGED VIEW OF FINAL PERIOD OF CHARGE VOLTAGE Vc (4) ENLARGED VIEW OF INTERSECTION BETWEEN VOLTAGES Vd AND Vd'

(1) CURRENT IL OF INDUCTANCE CIRCUIT 5

(2) CHARGE VOLTAGE Vc OF LOAD CAPACITOR 8

(3) COMPARE VOLTAGE Vh

CAPACITOR CHARGING METHOD AND CHARGING APPARATUS

BACKGROUND OF THE INVENTION

1. Field of the Invention

The present invention relates to a capacitor charging apparatus and charging method using an inverter, a switching regulator and an inductance circuit. More particularly, this invention relates to the capacitor charging apparatus and charging method which charge in two stages. This invention particularly relates to the capacitor charging apparatus and charging method which use resonant charging to achieve a highly accurate level of voltage stability, such that the charge voltage accuracy of the energy accumulating capacitor comprising the load is highly accurate to less than approximately 0.1%.

2. Description of the Related Art

In a pulse laser such as an excimer laser, the charge of a capacitor for accumulating energy, which has been charged to a high voltage of approximately several kV to several ten kV, is discharged at high speed to a laser tube via a magnetic compressor or the like, thereby exciting laser light. In the application apparatus of the pulse laser, the higher the number of laser light excitations (i.e. the higher the number of repetitions of charging and discharging the capacitor) the greater its capability as a laser apparatus. For this reason, in recent years there have been attempts to achieve a high repetition of several kHz. Consequently, the charging apparatus of the capacitor must be capable of repeating high-speed charge/discharge to completion below several hundred $\mu$s. Excimer lasers require a highly accurate level of voltage stability, detecting fluctuations in the output of laser light in each cycle and controlling the output of laser light in the subsequent cycle accordingly. Therefore, the charge voltage must be controlled in each cycle, making high-speed controllability an important feature.

FIG. 19 is a circuit diagram showing one example of the constitution of a conventional resonant charging-type capacitor charging apparatus. Reference numeral 1 represents a dc (direct current) power such as a rectifier which rectifies a commercial ac (alternating current) voltage. The output of the dc power 1 is supplied to a voltage-type bridge inverter 2 (hereinafter abbreviated as "inverter 2"). The inverter 2 comprises four IGBTs 4A–4D (insulated gate bipolar transistors) which feedback diodes 3A, 3B, 3C and 3D are connected to in reverse parallel.

The ac side output of the inverter 2 connects via an inductance circuit 5 to a primary winding 6A of a high-voltage transformer 6 (hereinafter abbreviated as "transformer 6"), becomes an ac high voltage boosted to a predetermined value at a secondary winding 6B, is converted to a dc high voltage by a high-voltage rectifier 7 (hereinafter abbreviated as "rectifier 7"), and is supplied to a load capacitor 8. The black dots appended to the primary winding 6A and the secondary winding 6B represent the polarities of the windings. The rectifier 7 is a bridge rectifier comprising four diodes 7A, 7B, 7C, and 7D. The inductance circuit 5 also includes the inductance leaked from the transformer 6.

Reference numerals 9 and 10 represent voltage division resistances for detecting charge voltage; the resistances 9 and 10 convert a charge voltage Vc of the load capacitor 8 to a charge voltage detect signal Vd of several V (hereinafter abbreviated as "detect voltage Vd"), which is input to a voltage comparator 11. Reference numeral 12 represents a reference voltage source for setting the charge voltage, and outputs a reference voltage Vr. The voltage comparator 11 compares the detected voltage Vd with the reference voltage Vr, outputting a comparison signal Vh at the H (high) level until the detected voltage Vd reaches the reference voltage Vr and outputting the comparison signal Vh at the L (low) level when the detected voltage Vd reaches the reference voltage Vr. To prevent the output comparison signal Vh from oscillating at the switchover point, the hysteresis of the voltage comparator 11 is set to approximately 0.1% of the charge voltage. Reference numeral 13 represents an inverter controller which supplies two A-phase and B-phase opposite phase signals through AND gates 14 and 15, one signal switching ON the pair of IGBTs 4A and 4D and the other signal switching ON the pair of IGBTs 4B and 4C alternately. In FIG. 19, a pair of IGBT gate signals is shown in common in order to illustrate the path of the signals, but in reality the gate signal of the IGBTs are separately insulated from each other.

The inductance circuit 5 which includes the leakage inductance from the transformer 6, the rectifier 7, and the load capacitor 8 form a half-wave series resonant circuit. The inductance circuit 5 is usually comprised of an inductor comprising the leakage inductance of the transformer 6 and an appropriate inductance, but when the inductance required for series resonance can be obtained by using only the leakage inductance of the transformer 6, the transformer 6 alone is sufficient. When the pair of IGBTs of the inverter 2 are switched ON in resonant half-cycles, the load capacitor 8 is charged by resonance to a voltage which is approximately twice the value obtained by multiplying the dc power voltage by the transform ratio n of the transformer 6. For example, when the dc power voltage Vd is 250 V, the capacity of the load capacitor 8 (Co) is 50 nF, and the boost ratio n of the transformer 6 is 20, the charge voltage Vc becomes Vc=2×n×Vdc=2×20×250=10 kV. The time during which the pair of IGBTs are ON corresponds to the charge time, that is, a resonant half-cycle. When the charge time (i.e. the resonant half-cycle) T/2=100 $\mu$s, the primary conversion value Co' of the load capacitor Co becomes Co'= $20^2 \times 50$ nF=20 $\mu$F. Since $2\pi\sqrt{LC}$=T, the inductance value L of the inductance circuit 5 becomes L=(T/2$\pi$)$^2$/Co'=25.3 $\mu$H. In actual conventional systems, the dc power voltage Vdc changes due to fluctuation in the commercial power voltage; for example, when the commercial power voltage fluctuates between AC 180 V to 220 V, the dc power voltage Vdc changes from 240 V to 300 V. Furthermore, the resonant effect decreases to less than twice as a result of circuit loss. For these reasons, the boost ratio n of the transformer 6 is set at more than 20, e.g. 25, and the circuit constant is set so that, when the pair of IGBTs are switched ON in a resonant half-cycle while the dc power voltage Vdc is at its lowest value, the charge voltage of the load capacitor Co is greater than the set voltage 10 kV. Therefore, the IGBT of the inverter are switched OFF when the charge voltage of the load capacitor Co has reached the set voltage 10 kV, stabilizing the charge voltage within the range of power voltage fluctuation.

Subsequently, the operation will be explained by referring to FIG. 20. In FIG. 20, symbol (1) shows the current IL of the inductance circuit 5, which is equivalent to a compound current of the current of the IGBT 4A and the diode for feedback 3A, connected in reverse parallel thereto, and the current of the IGBT 4B and the diode for feedback 3B, connected in reverse parallel thereto. In FIG. 20, the currents of the diodes for feedback 3A and 3B are shown by diagonal shading. In FIG. 20, symbol (2) shows the charge voltage Vc of the load capacitor 8, and symbol (3) shows a gate signal VgA of the IGBT 4A and 4D, and a gate signal VgB of the IGBT 4B and 4C. When the load capacitor 8 is being discharged at time t0 and the detect voltage Vd is lower than the reference voltage Vr, the voltage comparator 11 outputs an H signal, and the A-phase side signal of the inverter controller 13 passes through the AND gate 14, switching ON the pair of IGBT 4A and 4D which are on the diagonal line of the inverter 2. When the IGBT 4A and 4D are switched ON, a dc power voltage is applied to the resonant circuit and a resonant current IL flows to the inductance circuit 5, boosting the charge voltage Vc of the load capacitor 8 as shown in FIG. 20. When the charge voltage Vc of the load capacitor 8 has reached the set voltage value 10 kV at time t1, the voltage comparator 11 outputs an L-level compare signal Vh and the AND gate 14 blocks the gate signal, thereby switching OFF the pair of IGBT 4A and 4D. However, electromagnetic energy accumulates in the inductance circuit 5 as a result of the current IL flowing through the circuit up to that point, and causes an inertial current (i.e. feedback current) to flow as shown by the diagonally shaded section of FIG. 20.

The feedback current charges the load capacitor 8 while flowing back to the dc power 1 along the following path: right terminal of the inductance circuit 5—black-dotted terminal of the primary winding 6A of the transformer 6—black-dotted terminal of the secondary winding 6B of the transformer 6—diode 7A—load capacitor 8—diode 7D—non-black-dotted terminal of the secondary winding 6B of the transformer 6—non-black-dotted terminal of the primary winding 6A of the transformer 6—diode for feedback 3A—positive electrode to negative electrode of dc power 1—diode for feedback 3D—left terminal of the inductance circuit 5. The load capacitor 8 is charged by this inertial current and the charge voltage Vc exceeds the set voltage of 10 kV by ΔV as shown in FIG. 20.

After the load capacitor 8 has been discharged to an unillustrated load at time t2, the inverter controller 13 generates a B-phase signal which passes through the AND gate 15, switching ON the IGBTs 4B and 4C on the opposite diagonal line, whereby the current IL flows in the opposite direction to the inductance circuit 5 and the transformer 6. The current of the secondary winding 6B of the transformer 6 is rectified, charging the load capacitor 8. When the inverter 2 switches ON for one cycle, the load capacitor 8 is charged twice. The advantage of this bridge inverter-type resonant charging is that the switching frequency of the IGBT need only be half the charge frequency of the load capacitor 8; for example, when using an excimer laser and the like repeating a frequency of 4 kHz, a switching frequency of 2 kHz is sufficient, resulting in little switching loss.

However, this system has problems. One disadvantage of the conventional apparatuses is that even when the IGBT are OFF, the current which was flowing to the inductance circuit 5 at that point produces magnetic energy, generating an inertial current which charges the load capacitor 8 while passing through the diodes for feedback 3A to 3D, which are connected in reverse parallel to the IGBT and the like, and is fed back to the dc power 1. Consequently, the load capacitor 8 is over-charged. Even in a series resonant inverter (unillustrated) for driving the IGBT at frequencies related to the resonant frequencies of the inductance circuit 5 and capacitors for resonance, which are connected in series with the inductance circuit 5, when the charge voltage reaches the set value and the IGBT are switched OFF, an inertial current produced by the residual electromagnetic energy of the inductance circuit 5 over-charges the load capacitor 8. That is, in a capacitor charging apparatus comprising a voltage-type inverter which uses the inductance circuit on the ac side, even when the IGBT of the inverter are switched OFF, charging continues due to the inertial current and the load capacitor 8 becomes over-charged. FIG. 21 illustrates this problem, showing how the inertial current of the inductance circuit 5 over-charges the charge voltage Vc of the load capacitor 8 by ΔV, in spite of the fact that the inverter 2 was switched OFF when the compare signal Vh of the voltage comparator 11 has dropped to the L level.

SUMMARY OF THE INVENTION

To solve such problems of the related technology, the present inventors proposed a resonant-type capacitor charging apparatus and charging method (i.e., the first to fourth embodiments of the present application described later) using an inverter and an inductance in Japanese Patent Application No. 2000-193063 (unpublished). According to this, a switching element is provided on the secondary side of the transformer, and switches ON when the load capacitor (energy accumulating capacitor) has been charged to a set voltage, whereby the inertial current produced by the inductance bypasses the load capacitor, preventing the load capacitor from being charged. This prevents the load capacitor from being over-charged.

However, the invention according to Japanese Patent Application No. 2000-193063 also has problems, since in reality the switching element and its drive circuit are not ideal; there is delay in the operating time of the voltage comparator, which compares the charge voltage of the load capacitor with the reference voltage, delay in the operation of the switching element itself, delay in the operation of the drive circuit, and the like. The total of these delays is around several hundred ns, and the charging current continues flowing to the load capacitor during this delay in operating time, resulting in over-charging, albeit a small one. In chargers for loads which require a highly accurate level of voltage stability, such as excimer lasers, the output accuracy of the charger must be sufficiently stable that the fluctuation rate of the charge voltage of the load capacitor is less than approximately 0.1%; consequently, the small amount of over-charging becomes a problem. If the amount of over-charging were constant, the controller could anticipate this amount and adjust control accordingly, but the amount of over-charging during delay is not constant for the following reasons.

(1) Firstly, there are the effects of fluctuation in the power supply voltage. Even when the operating delay is constant, fluctuation in the power supply voltage changes the boost speed of the charge voltage, changing the amount of over-charging.

(2) Secondly, there are the effects of the residual voltage of the load Capacitor and fluctuation therein. After the load capacitor has been discharged by an excimer laser load or the like, there is a feedback current from the load side which charges the load capacitor to a low voltage, which becomes the residual voltage in the next charging cycle. In particular, in the case of resonant charging, a difference between the power supply voltage and the initial voltage of the load capacitor causes changes in the resonant current. Therefore, even when the operating delay has been anticipated, the voltage accuracy is decreased by the residual voltage of the load capacitor.

(3) Thirdly, there are the effects of changes in resistance caused by the temperature of the windings of the high-voltage transformer. The temperature of high-voltage transformers and the like increases after the charger has been operating for several hours, changing the resistance of the windings. Changes in resistance in the resonant circuit affect the charge voltage boost rate, reducing the level of voltage stability even when operating delay has been anticipated.

One conceivable way of solving these difficulties is to store data relating to fluctuation in the power supply voltage, residual voltage of the load capacitor, the amount of over-charge after the inverter has switched ON, and the like, beforehand in the CPU (central processing unit) of a computer, and to control the final charge voltage based on estimates. However, in view of the demand for high speed and the large quantity of the data, control becomes complex and it is difficult to ensure stable charge voltage accuracy. According to the present invention (described later in the first to fourth embodiments), the amount of over-charging of the load capacitor after the inverter has switched OFF can be minimized, greatly increasing the level of stability, but delay in the switching element for bypass and the drive circuit thereof makes it impossible to achieve a charge voltage of sufficient accuracy.

In addition to the disadvantages mentioned above, the related technology also has problems such as the following. For example, in a charging apparatus capable of repeatedly charging and discharging in a cycle of 4 kHz, a load capacitor, which has been charged up to the final charge voltage Vc1, discharges to a load comprising a magnetic compressor or the like in compliance with a laser shot command. A laser tube converts the output from the magnetic compressor to laser light, obtaining a stepper light source. The intensity of this laser light is detected by using a sensor, the detect signal is processed by a computer, and the next final charge voltage Vc2 of the load capacitor is calculated so that each shot of the laser light output is stable. This calculation requires a certain amount of time to perform, e.g. 180 $\mu$s. Assuming that the repeat frequency has a cycle of 4 kHz, then the time in one cycle is 250 $\mu$s, and assuming that the calculation time is 180 $\mu$s, a time of only 70 $\mu$s remains in which to charge. When the charge time decreases in this way, the temporary power of the charging apparatus must be greatly increased; this is not economical.

One method for solving this problem is a two-stage charging method in which charging commences prior to calculating and setting the charge voltage, the capacitor being charged up to approximately 50% of the minimum voltage used (hereinafter termed "intermediate voltage"). After charging to the intermediate voltage, charging continues to the final voltage which has been calculated and set.

Resonant charging is one such method of charging a capacitor. FIG. 22 is a circuit diagram showing one example of the constitution of a resonant charger using related technology, in which a first semiconductor switch 72, a resonant inductance circuit 73, a primary winding 75 of a transformer 74, and a second semiconductor switch 76 are connected in series from dc power 71. An energy accumulating capacitor 79 is connected to a secondary winding 77 of the transformer via a rectifying diode 78 which prevents reverse flow. Feedback diodes 80 and 81 to the dc power 71 are connected from the emitters and collectors of the first and second semiconductor switches 72 and 76.

The operation is as follows. When the first and second semiconductor switches 72 and 76 switch ON simultaneously, the resonant inductance circuit 73 and the energy accumulating capacitor 79 resonate in series, charging the energy accumulating capacitor 79 equivalently toward twice the power supply voltage. The charge voltage may be controlled by controlling the voltage of the dc power 71, or by switching the first and second semiconductor switches 72 and 76 OFF when the charge voltage has reached a target value. In the latter method, when the semiconductor switches are OFF, the current of the resonant inductance 73 charges the energy accumulating capacitor 79 while passing through the feedback diodes 80 and 81 to the dc power 71.

The advantage of resonant charging is that the switching frequency can be the same as the frequency for charging the energy accumulating capacitor. For example, when using an excimer laser and the like repeating charging and discharging in a frequency of 4 kHz, a switching frequency of 4 kHz is sufficient. In a charging apparatus which uses a converter, the semiconductor switches switch at the carrier frequency of the converter, e.g. 100 kHz, and there is considerable loss, but the two-stage charging method described above is easy. On the other hand there is a problem that, when the semiconductor switches are turned OFF during charging, the resonant current is fed back to the power, and it is not possible to charge to the set voltage for a predetermined short time, even after the switches have been turned ON again. Therefore, the resonant charging system can reduce loss, but cannot achieve high-speed charging by charging in two stages and cannot accommodate a high-frequency load.

It is an object of this invention to provide a charging apparatus comprising an inverter which uses an inductance circuit on its ac side, wherein, when the charge voltage of the load capacitor reaches a set value, the inertial current of the inductance circuit is bypassed so as not to overcharge the load capacitor, increasing the accuracy and stability of the charge voltage.

It is another object of this invention to provide a charging method and apparatus which take into consideration operating delay of the switching element for bypass and the drive circuit thereof, and have sufficient capacitor charging accuracy when the load is an excimer laser and the like requiring high accuracy and stability.

It is yet another object of this invention to provide a high-speed low-loss charging method and charging apparatus by making it possible to charge an energy accumulating capacitor in two stages by using resonant charging.

A first aspect of this invention provides a capacitor charging apparatus for charging a load capacitor, comprising an inductance circuit which provides a resonant current for charging the load capacitor by resonating with the load capacitor; and a switch circuit which cuts off the supply of an inertial current, produced by energy accumulated in the inductance circuit, to the load capacitor at a predetermined timing, the switch circuit being provided on the output side of the inductance circuit.

A second aspect of this invention provides a capacitor charging method for charging a load capacitor, comprising the steps of charging the load capacitor with a resonant current, generated by resonating the load capacitor with an inductance circuit which accumulates energy; and bypassing an inertial current, produced by energy accumulated in the inductance circuit, from the load capacitor at a predetermined timing so as to prevent the inertial current from flowing to the load capacitor, using a switch circuit, provided on the output side of the inductance circuit.

A third aspect of this invention provides a capacitor charging apparatus for charging a load capacitor to a set voltage, comprising a voltage converter which switches a dc power supply voltage; an inductance circuit which provides a resonant current for charging the load capacitor by applying the switched dc voltage and resonating with the load capacitor; and a switch circuit which short-circuits the output side of the inductance circuit when the charge voltage of the load capacitor has reached the set voltage so as to prevent an inertial current, produced by electromagnetic energy accumulated in the inductance circuit, from flowing to the load capacitor, the switch circuit being provided on the output side of the voltage converter.

A fourth aspect of this invention provides a capacitor charging method for charging a load capacitor to a set voltage, comprising the steps of charging the load capacitor by using a voltage converter to switch a dc power supply voltage, and supplying a resonant current to an inductance circuit by using resonance with the load capacitor and application of the dc voltage; and when the charge voltage of the load capacitor has reached the set voltage, switching OFF the voltage converter and bypassing an inertial current, produced by electromagnetic energy accumulated in the inductance circuit, from the load capacitor so as to prevent the inertial current from flowing to the load capacitor.

A fifth aspect of this invention provides a capacitor charging method for charging a load capacitor to a set voltage, comprising the steps of charging the load capacitor by using a voltage converter to switch a dc power supply voltage, and supplying a resonant current to an inductance circuit by using resonance with the load capacitor and application of the dc voltage; switching OFF the voltage converter when the charge voltage of the load capacitor has reached a target value, which is lower than the set voltage; further charging the load capacitor with an inertial current, produced by electromagnetic energy accumulated in the inductance circuit; and when the charge voltage of the load capacitor has reached the set voltage, switching ON a switch circuit, provided on the output side of the voltage converter, bypassing the inertial current from the load capacitor and so as to prevent the inertial current from flowing the load capacitor.

According to the present invention, after the charge voltage of the load capacitor has reached a set value, the inertial current of the inductance circuit bypasses the load capacitor so that the load capacitor is not over-charged by the accumulated energy of the inductance circuit. Therefore, the load capacitor can be prevented from being overcharged, and the accuracy of its charge voltage can be increased.

A sixth aspect of this invention provides a capacitor charging method for charging a load capacitor to a set voltage, comprising the steps of: charging the load capacitor by using a voltage converter to convert an applied dc power supply voltage to a predetermined dc voltage, and supplying a resonant current to an inductance circuit by using resonance with the load capacitor and application of the dc voltage; calculating a boost in charge voltage of the load capacitor by prediction within in an operating delay td from generating a charge stop command and the actual stop of charging, and stopping charging of the load capacitor by generating the charge stop command in anticipation of the boost in charge voltage; and short-circuiting the output side of the inductance circuit by switching ON a switch circuit, provided on the output side of the voltage converter, preventing an inertial current, produced by electromagnetic energy which has accumulated in the inductance circuit, to the load capacitor.

A seventh aspect of this invention provides a capacitor charging apparatus which charges a load capacitor to a set voltage, comprising a voltage converter which switches a dc power supply voltage; an inductance circuit which supplies a resonant current for charging the load capacitor by using resonance with the load capacitor and application of the dc voltage; a switch circuit which is provided on the output side of the voltage converter and, when switched ON, short-circuits the output side of the inductance circuit so as to prevent an inertial current, produced by electromagnetic energy which has accumulated in the inductance circuit, to the load capacitor; an ON signal generator which generates an ON signal for switching ON the switch circuit in compliance with a charge stop command; and an arithmetic circuit which calculates the charge voltage boost of the load capacitor during the operating delay between the generating of the ON signal by the ON signal generator and the stopping of charging as a result of the switch circuit switching ON, and transmits the charge stop command to the ON signal generator in anticipation of the charge voltage boost.

An eighth aspect of this invention provides a capacitor charging apparatus which charges a load capacitor to a set voltage, comprising a voltage converter which switches a dc power supply voltage; an inductance circuit which supplies a resonant current for charging the load capacitor by using resonance with the load capacitor and application of the dc voltage; a switch circuit which is provided on the output side of the voltage converter and, when switched ON, short-circuits the output side of the inductance circuit so as to prevent an inertial current, produced by electromagnetic energy which has accumulated in the inductance circuit, to the load capacitor; an ON signal generator which generates an ON signal for switching ON the switch circuit in compliance with a charge stop command; and a charge voltage detector which detects the charge voltage of the load capacitor as a charge voltage detect signal Vd; and an arithmetic circuit which calculates $(Vd+td \times dVd/dt)$ based on the charge voltage detect signal Vd and an operating delay td relating to the switch circuit, and, when $(Vd+td \times dVd/dt)=a$ predetermined reference voltage Vr, transmits the charge stop command to the ON signal generator.

According to the present invention, consideration is given to the operating delay of the switch circuit for bypass and the drive circuit thereof. During operation delay, the switch circuit is turned ON so that the inertial current, generated by energy which has accumulated in the inductance circuit, does not charge the load capacitor, thereby achieving sufficient capacitor charge accuracy even when the load comprises an excimer laser or the like.

A ninth aspect of this invention provides a method for charging a load capacitor in stages comprising a first step of charging the load capacitor to a predetermined voltage by supplying a resonant current, generated by resonance of an inductance circuit and a resonant capacity, from a power; a second step of cutting-off the resonant current to the load capacitor, and simultaneously maintaining the energy accumulated in the inductance circuit while circulating the energy; a third step of again charging the load capacitor to a set voltage, which is set in each charge cycle and is determined in consideration of load conditions, by supplying the resonant current to the load capacitor via the inductance circuit from the power; and a fourth step of again cutting-off the resonant current to the load capacitor, and simultaneously discharging the energy accumulated in the inductance circuit.

A tenth aspect of this invention provides a capacitor charging apparatus which charges a load capacitor to a set voltage in stages, comprising an inductance circuit which supplies a resonant current for charging the load capacitor by using resonance with the load capacitor and application of a predetermined dc voltage; a voltage converter which switches a dc power supply voltage, and is provided with a feedback circuit which, during a predetermined period, circulates energy, which has accumulated in the inductance circuit, while feeding back the energy to a dc power which generates the dc power supply voltage; a switch circuit which shuts off an inertial current, produced by the energy which has accumulated in the inductance circuit, from the load capacitor; a comparator which compares a reference voltage, set to a predetermined constant reference voltage or a variable reference voltage which is calculated from load conditions after each charge cycle, with the charge voltage of the load capacitor; a controller which firstly charges the load capacitor to an intermediate voltage corresponding to the constant reference voltage based on the comparison result from the comparator, and then stops the charging of the load capacitor, circulates the current of the inductance circuit by using the feedback circuit, and subsequently sets the variable reference voltage as the reference voltage, switches OFF the switch circuit and restarts the charging of the load capacitor, charges the load capacitor to the set voltage based on the comparison result of the comparator, and then, switches ON the switch circuit and bypasses the inertial current from the load capacitor.

In the present invention, the resonant charger allows two-stage charging, comprising a stage of circulating the energy which has accumulated in the inductance circuit until the next cycle. Therefore, the load capacitor can be charged at high speed and with low loss. Furthermore, since the switch circuit such as a semiconductor switch for bypass is provided on the output side of the voltage converter, it is possible to prevent the load capacitor from being overcharged while increasing the accuracy of the charge voltage.

An eleventh aspect of this invention provides a capacitor charging method for charging a load capacitor to a target voltage, comprising the steps of using a main charger to convert an applied dc power supply voltage to a predetermined dc voltage, and charging the load capacitor by supplying a resonant current, generated by resonance with the load capacitor and application of the dc voltage, to the inductance circuit; stopping the charging of the load capacitor by using the main charger to generate a charge stop command when the charge voltage of the load capacitor has reached a predetermined voltage near the target voltage, and preventing an inertial current, produced by energy which has accumulated in the inductance circuit, from flowing to the load capacitor by short-circuiting the output side of the inductance circuit by using a bypass switch circuit; and circuit thereafter, using an auxiliary charger, which is connected in parallel to the main charger, to charge to 100% of the target voltage and auxiliarily charge the discharge of the load capacitor.

A twelfth aspect of this invention provides a capacitor charging apparatus which charges a load capacitor to a target voltage, comprising a main charger comprising a voltage converter which converts a dc power supply voltage to a predetermined dc voltage, an inductance circuit which supplies a resonant current for charging the load capacitor by using resonance with the load capacitor and application of the predetermined dc voltage, and a bypass switch circuit which short-circuits the output side of the inductance circuit by using a charge stop command, and prevents an inertial current, produced by electromagnetic energy of the inductance circuit, from flowing to the load capacitor, the bypass switch circuit being provided on the output side of the voltage converter; and an auxiliary charger which is connected in parallel with the main charger; the main charger charging the load capacitor, and generating a charge stop command when the charge voltage of the load capacitor has reached a predetermined voltage near the target voltage, shutting off the load capacitor from the electromagnetic energy of the inductance circuit by using the bypass switch circuit; and the auxiliary charger charging to 100% of the target voltage and auxiliarily charging the discharge of the load capacitor.

In conventional methods using a main charger and an auxiliary charger, the main charger charges the load capacitor to approximately 95% of the target voltage, and the remaining portion is charged by the auxiliary charger to 100%. The auxiliary charger requires a capacity having a large maximum output in order to charge the remaining portion to 100% within a predetermined time, and the output voltage of the auxiliary charger itself must be highly accurate. However, due to the effect of inertial current, which is generated by electromagnetic energy of the inductance circuit and flows to the energy accumulating capacitor, it has not been possible to achieve highly accurate charging of the energy accumulating capacitor at less than approximately 0.1%.

In contrast, according to the present invention, a high-frequency converter-type auxiliary charger is connected in parallel to the main charger, and the load capacitor is charged by the output from the main charger, which uses electromagnetic energy of the inductance circuit. When the charge voltage of the load capacitor has reached, for example, more than 99% of the target voltage, the electromagnetic energy of the inductance circuit is shut off from the load capacitor. Thereafter, the auxiliary charger having, for example, a power capacity of 2% to 9%, or more preferably, 4% to 5% of the power capacity of the main charger, charges with high accuracy to 100% of the target voltage value. In addition, the auxiliary charger performs auxiliary charging to counter discharge of the energy accumulating capacitor caused by current leakage, detect current, and the like, thereby achieving highly accurate charging of below approximately 0.1%. Therefore, the charge voltage can be controlled easily and reliably for a long period of time, and the stability of the charge voltage of an energy accumulating capacitor which requires highly accurate voltage stability, such as an excimer laser power, can be improved to less than approximately 0.1%.

DETAILED DESCRIPTION OF THE PREFERRED EMBODIMENTS

Embodiments of the present invention will be explained with reference to the drawings.

Figure 1:
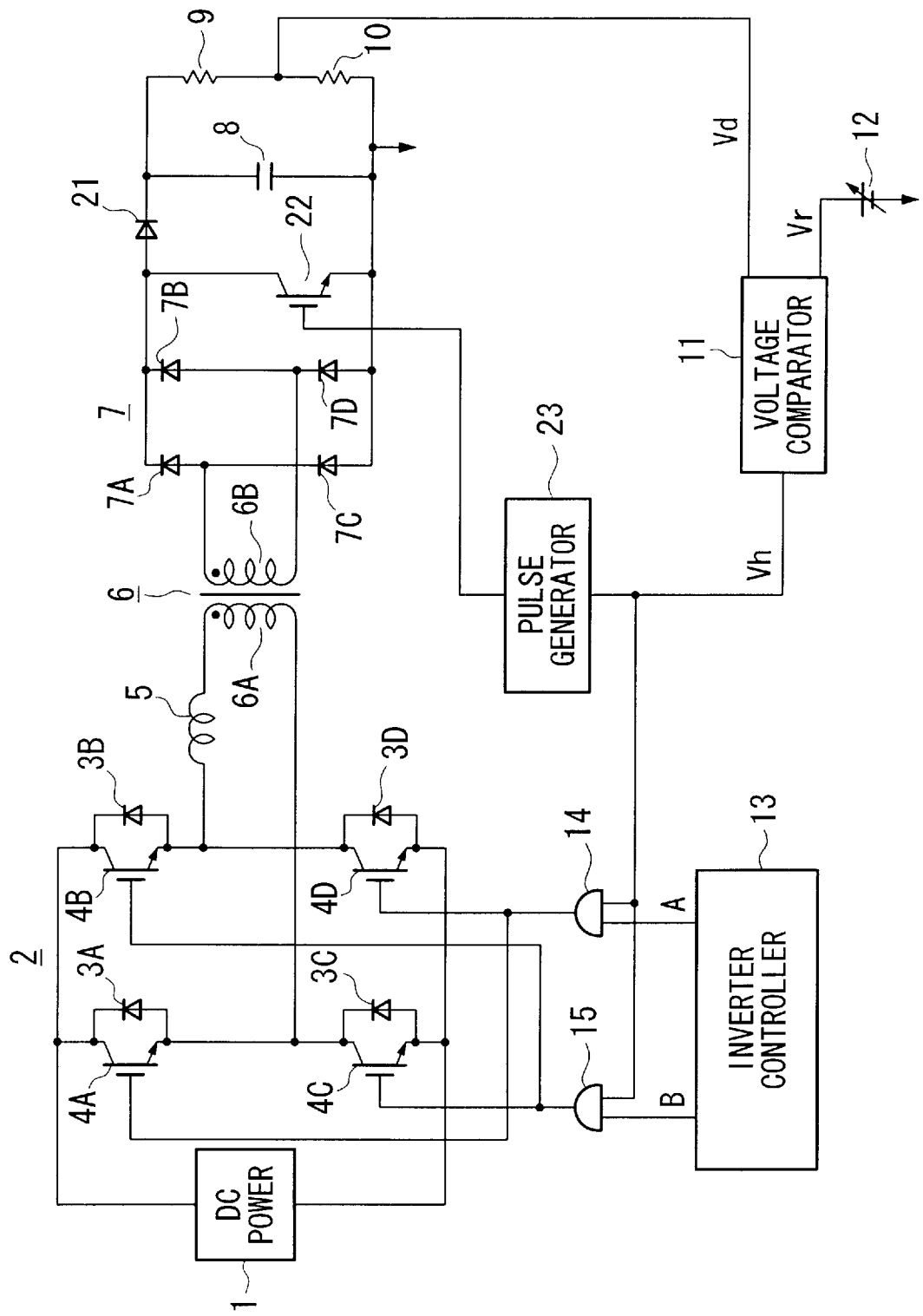
FIG. 1 is a circuit diagram showing the constitution of a capacitor charging apparatus according to a first embodiment of the present invention.

A resonant charging-type capacitor charging apparatus according to a first embodiment of this invention will be explained based on FIG. 1. The reference numerals used in FIG. 1 represent the corresponding components shown in FIG. 19. In this embodiment, a diode for preventing counter-discharge 21 is connected in the charge current direction in series with a load capacitor 8, which constitutes the load of the capacitor charging apparatus; in addition, a switching element 22 for short-circuiting is connected between the dc terminals of a rectifier 7. A pulse generator 23 is connected to the output of a voltage comparator 11, and supplies a pulse having a predetermined width to the gate electrode of the switching element 22 when a compare signal Vh has dropped to the L level. Various types of semiconductor switches can be used as the switching element 22, such as an FET (field effect transistor), an IGBT, an IEGT (injection enhanced type MOS {metal oxide semiconductor} gate transistor), thyristor, and the like. In particular, a semiconductor element without an active turn-off function, such as an SCR (silicon controlled rectifier) can be used for reasons that will be explained later. In the case where there is a high charge voltage of several kV which exceeds the voltage tolerance of ordinary semiconductor elements, the switching element 22 may be comprised of a necessary number of these elements connected in series. The principal concepts of the present invention do not pertain to this series circuit and methods for driving it, and since it is commonly used technology it will not be explained in detail.

Figure 2:
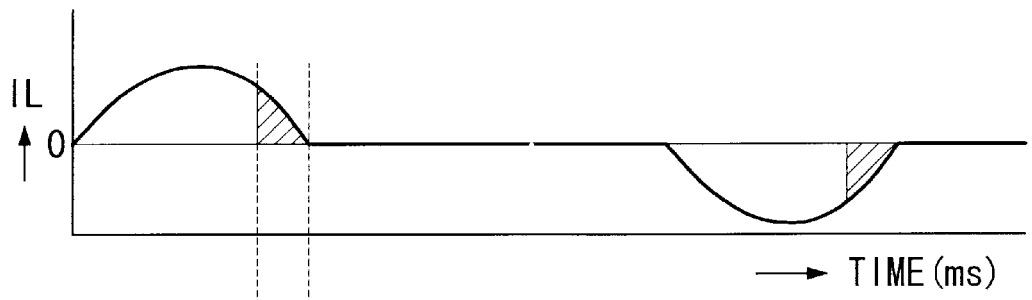
FIG. 2 is a diagram showing current and voltage waveforms to explain the operation of FIG. 1.
Figure 2:
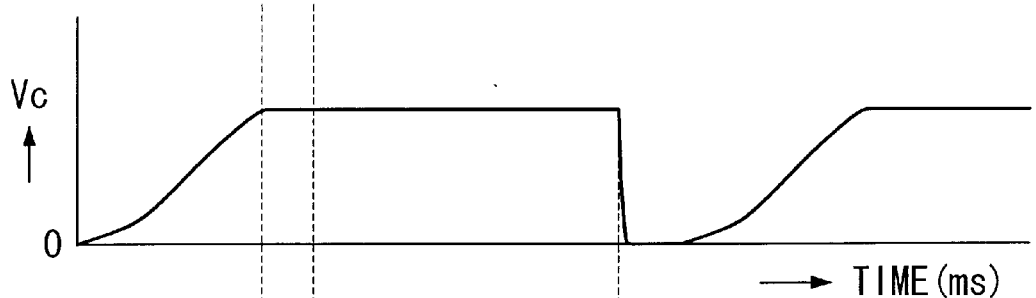
Figure 2:
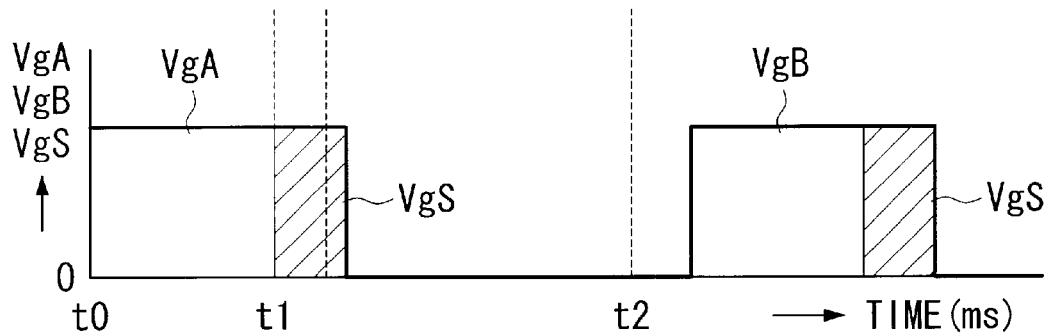

The operation of this embodiment will be explained by using FIG. 2. In FIG. 2, symbol (1) shows the current IL of an inductance circuit 5, which is equivalent to a compound current of the current of an IGBT (or a switching semiconductor element such as an MOSFET; this example uses an IGBT) 4A and a diode for feedback 3A, which is connected in reverse parallel thereto, and the current of an IGBT 4B and the diode for feedback 3B, which is connected in reverse parallel thereto. The currents of the diodes for feedback 3A and 3B are shown by diagonal shading. In FIG. 2, symbol (2) shows the charge voltage Vc of the load capacitor 8, and symbol (3) shows a gate signal VgA of the IGBT 4A and 4D, a gate signal VgB of the IGBT 4B and 4C, and the gate signal VgS (diagonally shaded section) of the switching element 22.

When the load capacitor 8 is being discharged at time t0 and the detect voltage Vd is lower than the reference voltage Vr, the voltage comparator 11 outputs a compare signal Vh at the H level, and the A-phase side signal of the inverter controller 13 passes through the AND gate 14, switching ON the pair of IGBT 4A and 4D which are on the diagonal line of the inverter 2. When the IGBT 4A and 4D are switched ON, a dc voltage is applied to the resonant circuit and a resonant current IL flows to the inductance circuit 5, boosting the charge voltage Vc as shown by symbol (2) of FIG. 2. Since the compare signal Vh is at the H level at this time, the pulse generator 23 does not operate and the switching element 22 is OFF.

When the charge voltage Vc of the load capacitor 8 has reached a set value of, for example, 10 kV after time t1, the voltage comparator 11 outputs a compare signal Vh at the L level and the AND gate 14 stops the gate signal from being transmitted to the pair of IGBT 4A and 4D, switching them OFF. Simultaneously, the pulse generator 23 is triggered by the fall of the compare signal Vh from H to L, and applies a pulse to the gate electrode of the switching element 22, switching the switching element 22 ON and consequently short-circuiting the dc terminals of the rectifier 7. In this embodiment, when the switching element 22 switches ON and the inverter 2 is OFF, electromagnetic energy of the inductance circuit 5 as shown by the diagonally shaded section in symbol (1) of FIG. 2, produced by the current IL which was flowing through the circuit until that point, does not flow to the load capacitor 8 and becomes instead a feedback current which flows back to the dc power 1 by the following path.

The path of the feedback current comprises: right terminal of the inductance circuit 5—black-dotted terminal of the primary winding 6A of the transformer 6—black-dotted terminal of the secondary winding 6B of the transformer 6—diode 7A—switching element 22—diode 7D—non-black-dotted terminal of the secondary winding 6B of the transformer 6—non-black-dotted terminal of the primary winding 6A of the transformer 6—diode for feedback 3A—positive electrode to negative electrode of dc power 1—diode for feedback 3D—left terminal of the inductance circuit 5. In this way, the switching element 22 bypasses the flow of the inertial current to the load capacitor 8, preventing the load capacitor 8 from being over-charged. Even when the switching element 22 is ON, the diode for preventing counter-discharge 21 prevents the load capacitor 8 from discharging via the switching element 22. In order to prevent the inertial current from being cut off midway, the time width of the pulse output from the pulse generator 23 is set at a time greater than that required for the inertial current to reach zero; consequently, the switching element 22 does not turn OFF until the inertial current reaches zero. This time width is normally set to greater than one-half of the resonant cycle of the inductance circuit 5 and the load capacitor 8, i.e. the time until the other pair of IGBTs switches ON immediately thereafter.

Subsequently, after the load capacitor 8 has been discharged by an unillustrated load at time t2, the IGBTs 4B and 4C on the opposite diagonal line switch ON, whereby the current IL flows in the opposite direction to the inductance circuit 5 and the transformer 6. The current of the secondary winding 6B of the transformer 6 is rectified by the rectifier 7, charging the load capacitor 8. When the charge voltage Vc reaches the set value 10 kV, as described above, the inverter 2 switches OFF, and simultaneously the switching element 22 switches ON again, bypassing the inertial current produced by the electromagnetic energy of the inductance circuit 5, preventing the load capacitor 8 from being over-charged and returning the electromagnetic energy of the inductance circuit 5 to the dc power 1. Since the inertial current flowing in the switching element 22 becomes zero when all of the electromagnetic energy of the inductance circuit 5 has returned to the dc power 1, the inductance circuit 5 suffers no turn-off switching loss. The current declines naturally to zero even when using a thyristor.

Embodiment 2

Figure 3:
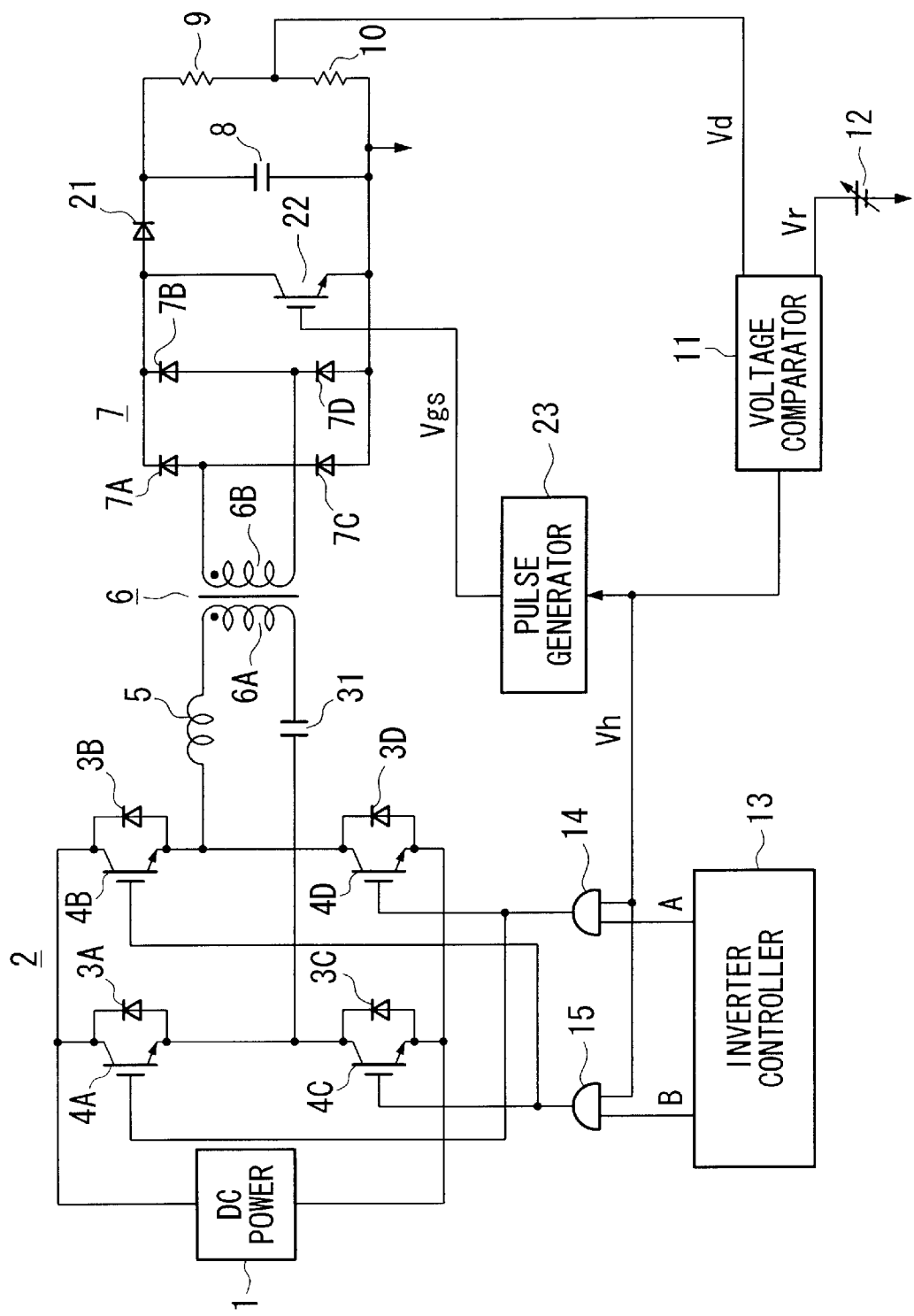
FIG. 3 is a circuit diagram showing the constitution of a capacitor charging apparatus according to a second embodiment of the present invention.

FIG. 3 shows an embodiment of this invention applied in a capacitor charging apparatus using a series resonant-type inverter. In FIG. 3, the same reference numerals as those in FIG. 1 represent corresponding components. Reference numeral 31 represents a resonant capacitor which resonates in series with the inductance circuit 5. The resonant frequency is sufficiently higher than the resonant frequency of the inductance circuit 5 and the load capacitor 8, e.g. 40 kHz. The inverter controller 13 switches each pair of IGBTs 4A and 4D, 4B and 4C in the inverter 2, alternately ON at a frequency near the resonant frequency, e.g. 30 kHz, at a duty cycle having a constant pulse width e.g. 40% of one-cycle.

Figure 4:
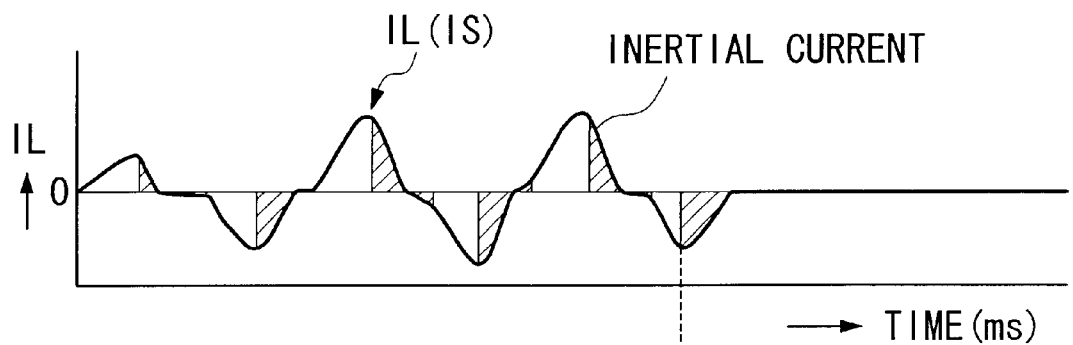
FIG. 4 is a diagram showing current and voltage waveforms to explain the operation of FIG. 3.
Figure 4:
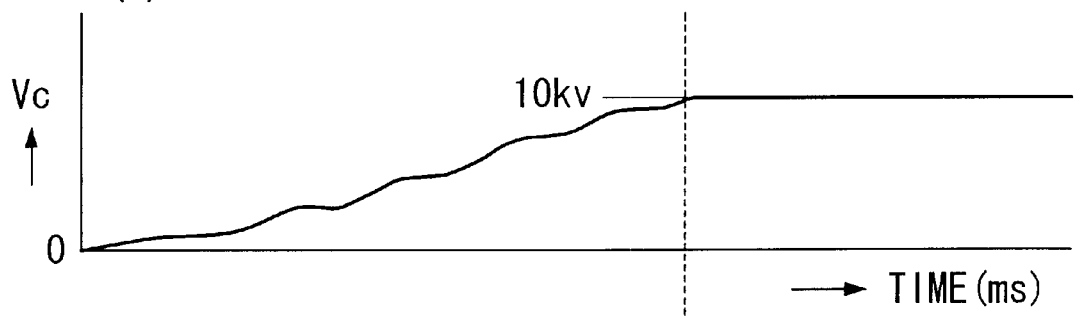
Figure 4:
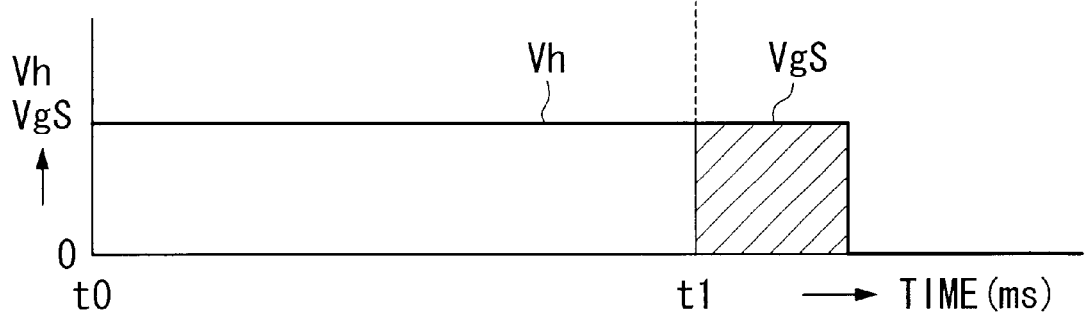

The operation of this embodiment will be explained using FIG. 4. In FIG. 4, symbol (1) shows the current IL of the inductance circuit 5, and the inertial current is shown by diagonal shading. The current IL is equivalent to the sum of the currents flowing in the IGBTs 4 and the diodes for feedback 3, which are connected in reverse parallel thereto. In FIG. 4, symbol (2) shows the charge voltage Vc of the load capacitor 8, and symbol (3) shows the compare voltage Vh and the gate signal VgS of the switching element 22. The gate signal VgS is diagonally shaded.

The load capacitor 8 is discharged in time t0. The detect voltage Vd is lower than the reference voltage Vr of the reference voltage source 12, and the voltage comparator 11 outputs the compare signal Vh at the H level. The AND circuit 14 allows the gate signal to pass, whereby the pair of IGBTs 4A and 4D on the opposite angle of the inverter 2 switch ON in alternation with the pair of IGBTs 4B and 4C. When these pairs of IGBTs are switched alternately ON, the current IL produced by resonance flows through the inductance circuit 5, boosting the charge voltage Vc of the load capacitor 8 as shown by symbol (2) of FIG. 2. Since the compare signal Vh is at the H level at this time, the pulse generator 23 does not operate and the switching element 22 remains OFF.

When the charge voltage Vc of the load capacitor 8 reaches the predetermined voltage 10 kV after time t1, the voltage comparator 11 outputs an L-level compare signal Vh and the AND gate 14 blocks the transmission of the gate signal to the pair of IGBTs 4A and 4D, switching OFF the inverter 2. Simultaneously, the compare signal Vh charges from the H to L level, triggering the pulse generator 23 so that the gate signal VgS is supplied to the gate electrode of the switching element 22. The switching element 22 turns ON, short-circuiting the dc terminals of the rectifier 7. In this embodiment, when the switching element 22 is ON and the inverter 2 is OFF, the electromagnetic energy of inductance circuit 5, generated by the current IL which was flowing through the circuit until that point, bypasses the load capacitor 8 due to the switching element 22 and becomes a feedback current which is fed back to the dc power 1 along the following path.

The current flows along a path comprising: right terminal of the inductance circuit 5—black-dotted terminal of the primary winding 6A of the transformer 6—black-dotted terminal of the secondary winding 6B of the transformer 6—diode 7A—switching element 22—diode 7D—non-black-dotted terminal of the secondary winding 6B of the transformer 6—non-black-dotted terminal of the primary winding 6A of the transformer 6—resonant capacitor 31—diode for feedback 3A—positive electrode to negative electrode of dc power 1—diode for feedback 3D—left terminal of the inductance circuit 5. Therefore, the switching element 22 bypasses the inertial current to the load capacitor 8, preventing the load capacitor 8 from being over-charged. Even when the switching element 22 is ON, the counter-discharge prevention action of the diode for preventing counter-discharge 21 prevents the load capacitor 8 from discharging.

Embodiment 3

Figure 5:
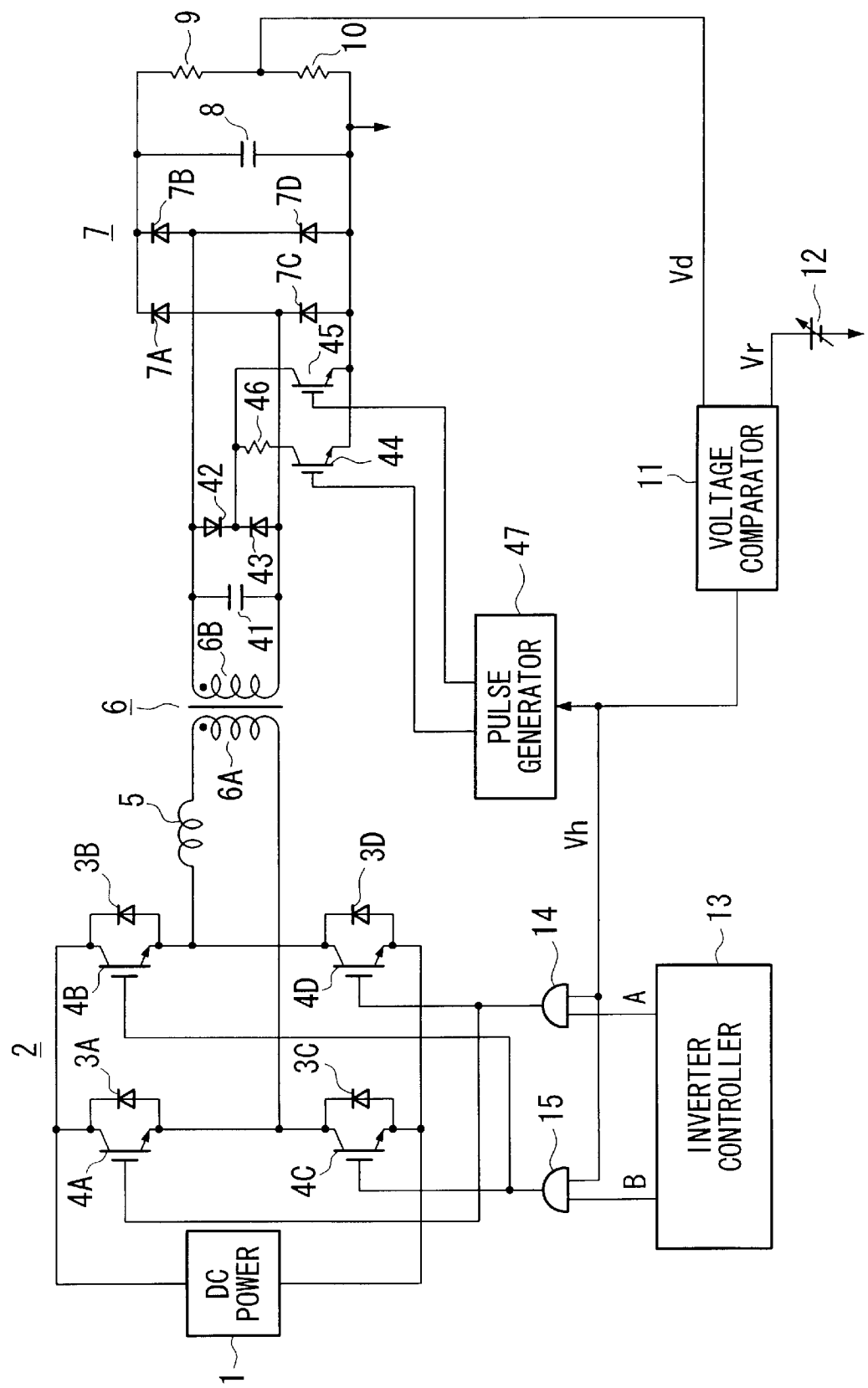
FIG. 5 is a circuit diagram showing the constitution of a capacitor charging apparatus according to a third embodiment of the present invention.

Subsequently, FIG. 5 shows another embodiment wherein this invention is applied in a capacitor charging apparatus using a resonant-type inverter. In FIG. 5, the same reference numerals as those in FIGS. 1 and 3 represent corresponding components. Reference numeral 41 represents a resonant capacitor, which is connected in parallel with the secondary winding 6B of the transformer 6. This differs from series resonance in that the capacitor 41 is connected in parallel equivalently with the load circuit. The capacitor 41 resonates with the inductance circuit 5. The resonant frequency is sufficiently higher than the resonant frequency of the inductance circuit 5 and the load capacitor 8, e.g. 40 kHz. The inverter controller 13 switches each pair of IGBTs 4A and 4D, 4B and 4C, alternately ON at a frequency near the resonant frequency, e.g. 30 kHz, at a duty cycle having a constant pulse width e.g. 40% of one-cycle. The converter comprising the resonant inverter is a conventionally known circuit, and for this reason its operation will not be explained here. The resonance of the inductance circuit 5 and the capacitor 41 equivalently boosts the voltage of the capacitor 41 to values greater than the power supply voltage; the resonant voltage is rectified and the capacitor 8 is charged.

In this embodiment, diodes 42 and 43 are connected in series in reverse directions to the secondary winding 2B of the transformer 6 so that their cathodes face each other. Two switching elements 44 and 45 are connected at the connection point and between the grounds, and a protective resistance 46 is connected in series with the switching element 44. The diodes 7A and 7B of the rectifier 7 separate these circuits from the load capacitor 8. The switching elements 44 and 45 are respectively driven by two signals with a time difference therebetween which are output from a pulse generator 47. For example, when the secondary winding of the transformer 6 is directly short-circuited by the switching element as in the embodiment already described above, the resonant capacitor 41 is also short-circuited, leading to a danger that the discharge current of the capacitor 41 will damage the switching elements. For this reason, the switch of this embodiment has a two-stage constitution. When the charge voltage has reached its target value, the switching element 44 switches ON a short time (e.g. approximately 1 μs) before the switching element 45, and the resonant capacitor 41 is firstly discharged via the protective resistance 46.

At a high-frequency resonance of several tens of kHz, the resonant capacitor 41 is considerably smaller than the load capacitor 8, being approximately several hundred to one-thousand pF. When the protective resistance 46 has a value of, for example, 1 kΩ. the resonant capacitor 41 is discharged in a time of approximately 1 μs, the first switching element 44 and the protective resistance 46 enabling discharge to be performed with a safe current. When the voltage of the resonant capacitor 41 drops below the charge voltage of the load capacitor 8, the load capacitor 8 is not over-charged but since only the first switching element 44 is ON, the protective resistance 46 consumes the inertial current, leading to heat loss. Therefore, the second switching element 45 bypasses the inertial current so that it does not flow to the protective resistance 46. After the second switching element 45 has turned ON, the first switching element 44 does not function and may be turned OFF. Incidentally, since the duty cycle of the current to the first and second switching elements 44 and 45 and the series diodes 42 and 43 is small, there is an advantage that low-current capacity diodes can be used as the diodes 42 and 43.

Embodiment 4

Figure 6:
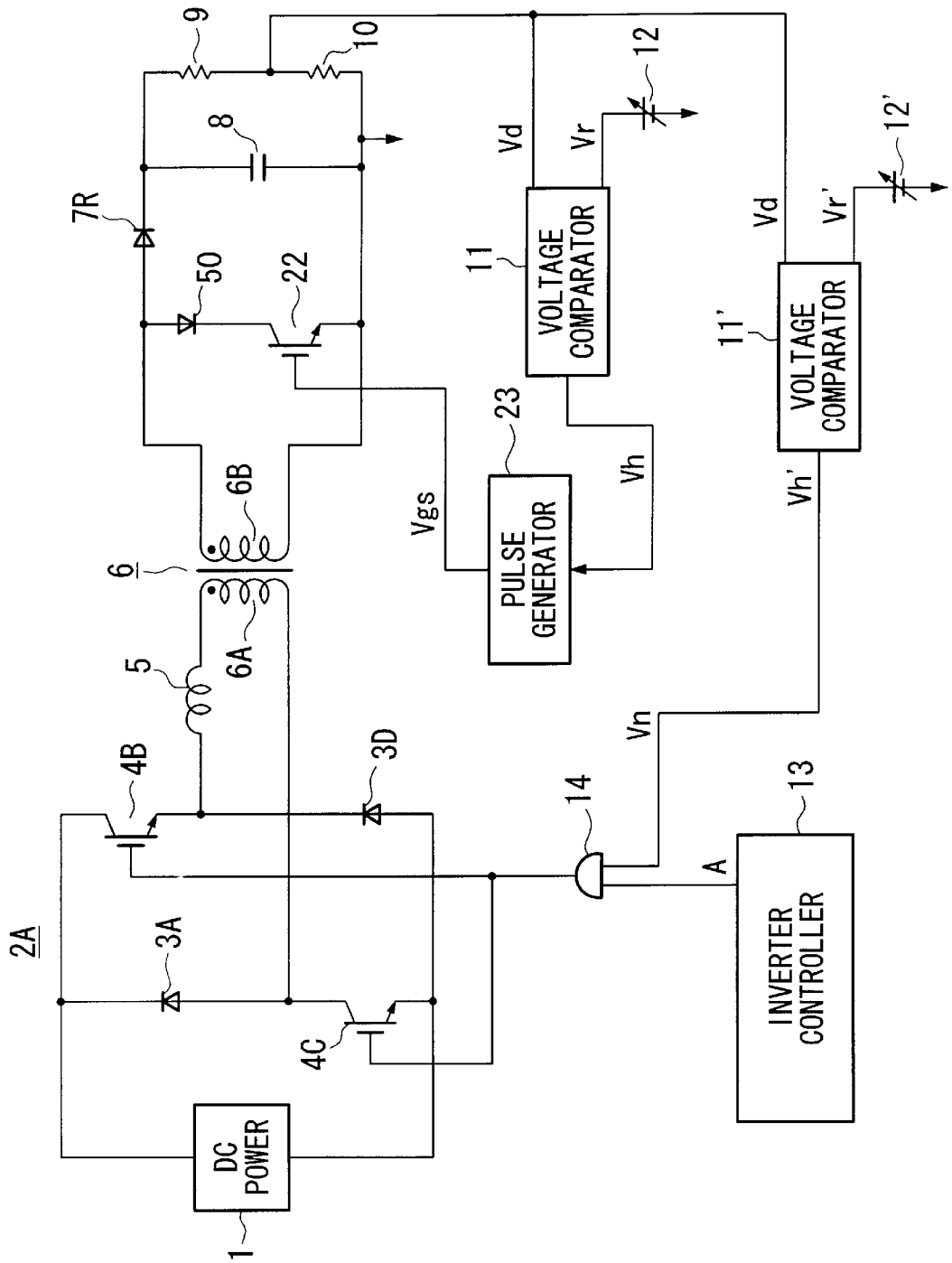
FIG. 6 is a circuit diagram showing the constitution of a capacitor charging apparatus according to a fourth embodiment of the present invention.

Subsequently, FIG. 6 shows an embodiment of a resonant charging-type capacitor which uses a double forward inverter as its voltage inverter. A double forward inverter 2A performs a half-wave operation so that a unidirectional power supply voltage is applied to the primary winding 6A of the transformer 6. In FIG. 6, the same reference numerals as those in FIG. 1 represent corresponding components. The double forward inverter 2A comprises A-phase IGBTs 4B and 4C, which switch ON simultaneously, and diodes for feedback 3A and 3D. This construction does not include the B-phase IGBTs 4A and 4D, and consequently does not require the diodes for feedback 3B and 3C. The rectifier which is connected to the secondary winding 6B of the transformer 6 is a half-wave rectifier comprising one rectifying diode 7R. The switching circuit for short-circuiting the inertial current is a series connected circuit comprising a switching element 22 and a diode 50, connected to the anode of the rectifying diode 7R. In this embodiment, a second voltage comparator 11' and a second reference voltage source 12' are provided in order to switch the inverter 2A OFF when the charge voltage Vc of the load capacitor 8 reaches a target value, which is a predetermined value lower than the set value, the voltage comparator 11' outputs the second compare signal Vh' to an AND gate 14. The second reference voltage source 12' outputs a reference voltage Vr' which is slightly lower than the reference voltage Vr of the first reference voltage source 12.

The basic operation is similar to the A-phase operation in FIG. 1, and will be simply explained. When the A-phase IGBTs 4B and 4C turn ON, a unidirectional power supply voltage is applied to the primary winding 6A of the transformer 6, and the inductance circuit 5 for resonance and the load capacitor 8 resonante in series at a half-wave via the rectifying diode 7R, charging the load capacitor 8. When the charge voltage Vc reaches the target value, the detect voltage Vd equals the reference voltage Vr' of the reference voltage source 12', whereby the compare signal Vh', which is output by the voltage comparator 11', drops to the L level and the IGBTs 4B and 4C turn OFF. Since the detect voltage Vd has not yet reached the reference voltage Vr of the first reference voltage source 12 at this point, the switching element 22 is kept OFF, and consequently the inertial current produced by the electromagnetic energy of the transformer 6 flows to the load capacitor 8, thereby charging the load capacitor 8. When the inertial current has increased the charge voltage Vc of the load capacitor 8 to the set value, the detect voltage Vd becomes equal to the reference voltage Vr of the reference voltage source 12, and the compare signal Vh, output from the voltage comparator 11, drops to the L level. Therefore, the pulse generator 23 switches the switching element 22 ON by applying the gate signal Vgs thereto, and the remaining inertial current of the inductance circuit 5 bypasses the load capacitor 8. As a consequence, the load capacitor 8 can be prevented from over-charging as in the embodiment described earlier.

In the present embodiment, since most of the inertial current of the inductance circuit 5 flows to the load capacitor 8 and charges it, power loss can be reduced and efficiency can be increased. Moreover, by switching the switching semiconductor element of the inverter 2 OFF when the charge voltage Vc of the load capacitor 8 has reached the set value so that the inertial current of the inductance circuit 5 becomes zero, there is no need for the inertial current to bypass the load capacitor 8, and the circuit such as the switching element 22 for bypassing the inertial current can be omitted from the construction. Even when the switching element 22 is ON, the counter-discharge prevention action of the rectifying diode 7R prevents the charge of the load capacitor 8 from being discharged via the switching element 22.

The feedback path of the inertial current comprises: right terminal of the inductance circuit 5—black-dotted terminal of the primary winding 6A of the transformer 6—black-dotted terminal of the secondary winding 6B of the transformer 6—diode 750—switching element 22—non-black-dotted terminal of the secondary winding 6B of the transformer 6—non-black-dotted terminal of the primary winding 6A of the transformer 6—diode for feedback 3A—positive electrode to negative electrode of dc power 1—diode for feedback 3D—left terminal of the inductance circuit 5.

In each of the above embodiments, the magnetizing current of the transformer is usually sufficiently smaller than the circuit resonant current as to have no considerable effect on the performance of the embodiment, and has been ignored in the above descriptions in order to facilitate understanding. However, depending on the design of the transformer, there are cases where the transformer has a large magnetizing current; the duration which the switching element is turned ON for in such a case will be explained.

The first embodiment shown in FIG. 1 will be explained by way of example. When the voltage of the load capacitor 8 reaches the set voltage, the IGBTs 4A and 4D of the inverter 2 switch OFF, and the switching element 22 switches ON, the magnetizing current of the transformer 6 is short-circuited at the switching element 22 and is circulated through the circuit comprising the secondary winding 6B, the diode 7A, the switching element 22, and the diode 7D. When the switching element 22 switches OFF before the magnetizing current attenuates due to loss in these secondary side components, the magnetizing current flows toward the primary and secondary windings, but the presence of the inductance circuit 5 on the primary side prevents any great changes in the current. Therefore, the magnetizing current flows to the secondary winding 6B, charging the load capacitor 8 and leading to a danger of over-charging. To avoid this, the switching element 22 should preferably be switched OFF after the magnetizing current has attenuated to zero. To achieve this easily, the switching element 22 should be switched OFF immediately before the switching semiconductor element of the inverter switches ON and charging starts again, or at the same time as the switching semiconductor element, so that the magnetizing current can be used as charge current for the load capacitor 8 when the switching semiconductor element subsequently switches ON.

In addition to the various constitutions of the inverter described in the above embodiments, other constitutions may be envisaged, such as a half-bridge type inverter comprising a pair of capacitors and a pair of switching semiconductor elements connected in a bridge circuit, a single ended inverter, and the like.

Embodiment 5

Figure 7:
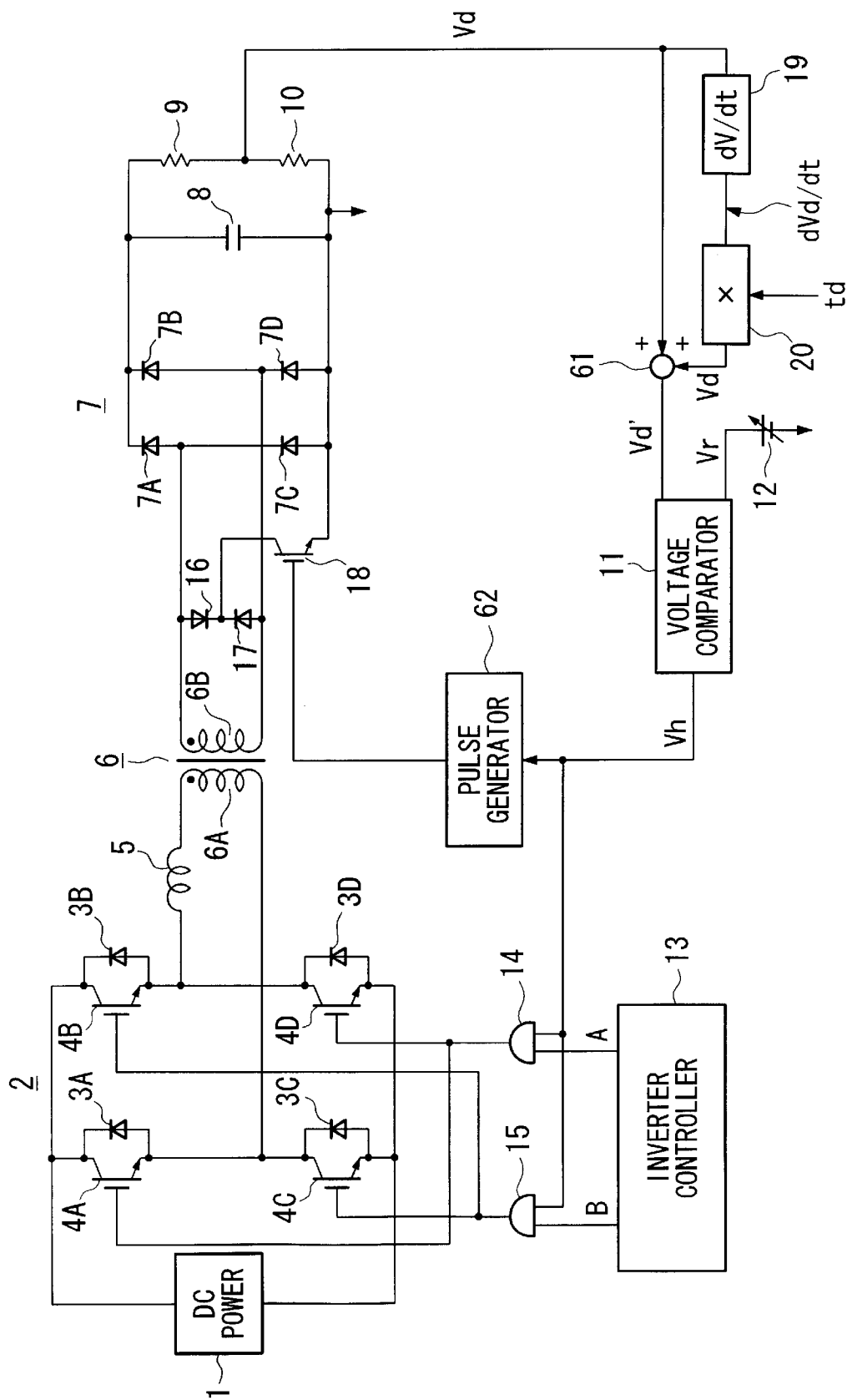
FIG. 7 is a circuit diagram showing the constitution of a capacitor charging apparatus according to a fifth embodiment of the present invention.
Figure 19:
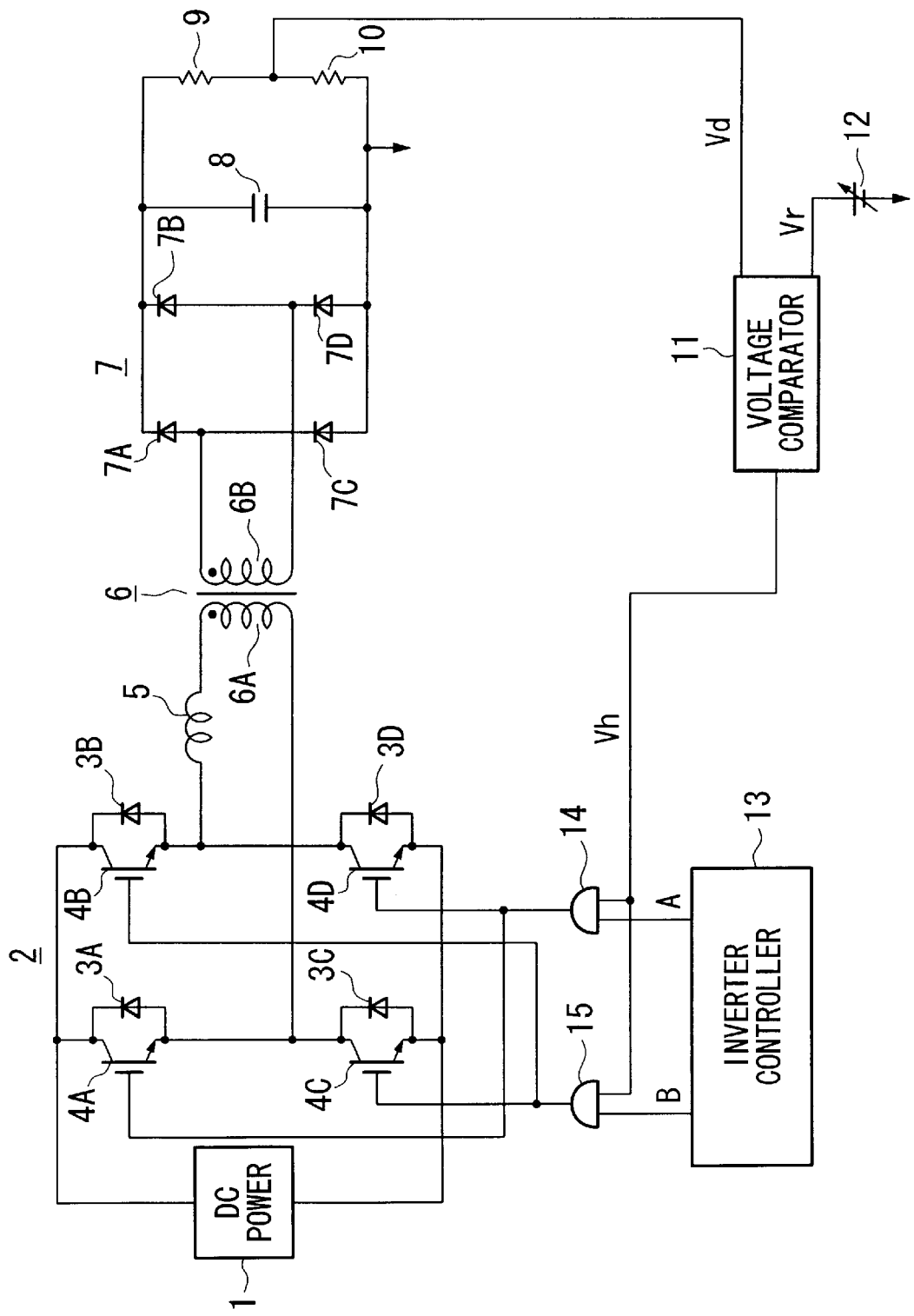
FIG. 19 is a diagram showing one example of a conventional capacitor charging apparatus.
Figure 20:
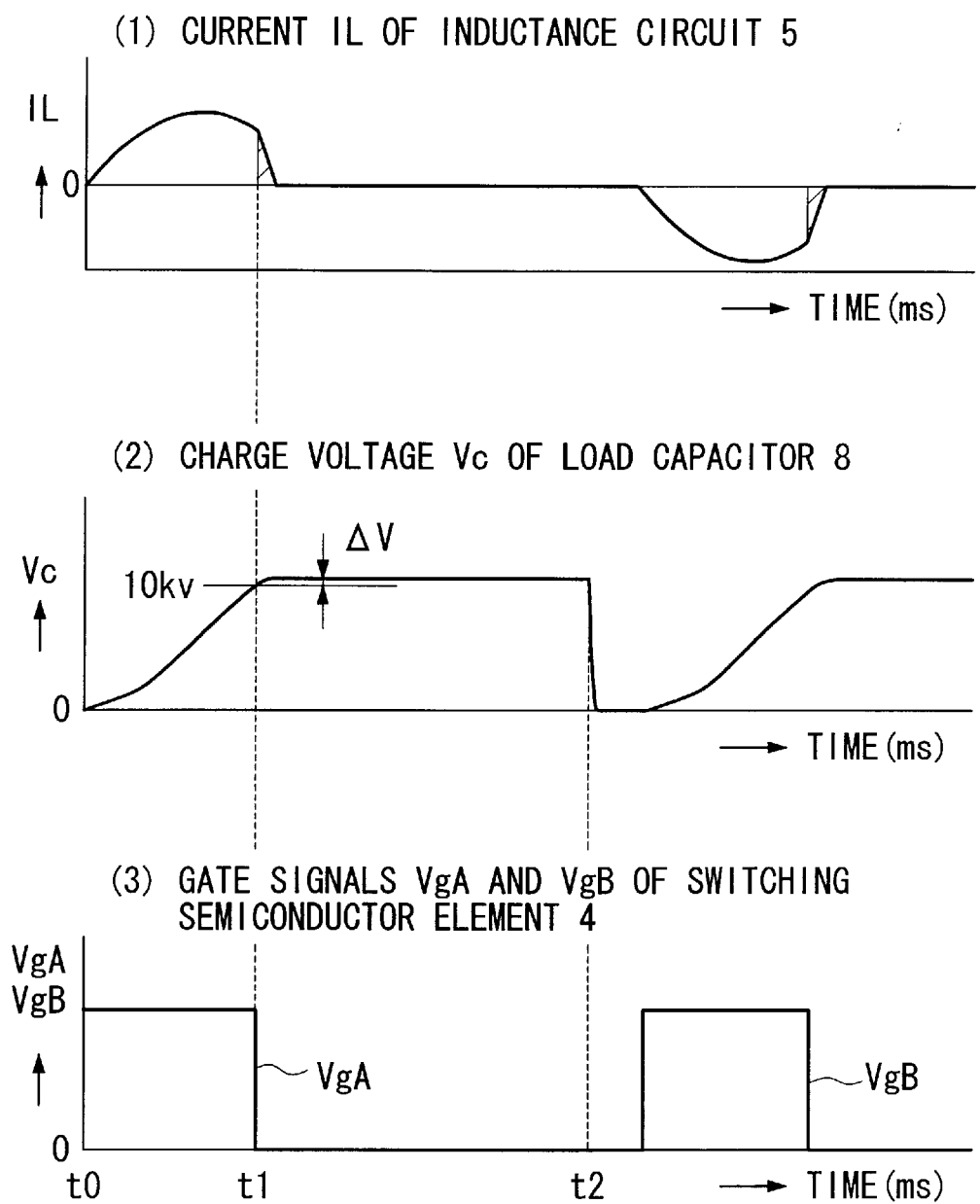
FIG. 20 is a diagram showing current and voltage waveforms to explain the operation of the apparatus of FIG. 19.
Figure 21:
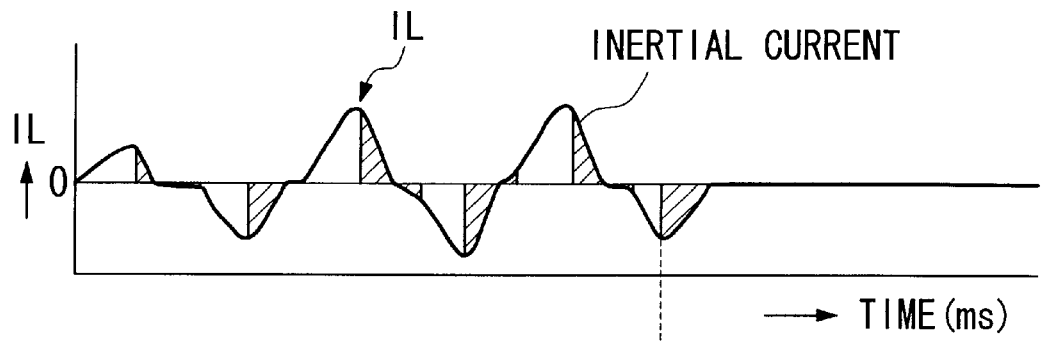
FIG. 21 is a diagram showing current and voltage waveforms to explain the operation of the apparatus of FIG. 19.
Figure 21:
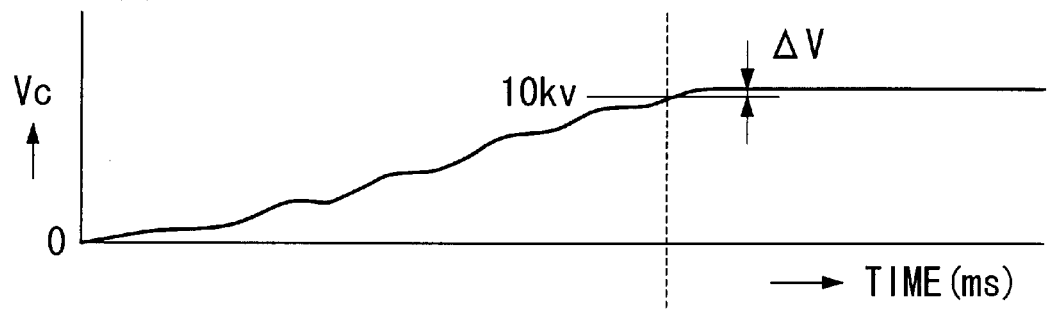
Figure 21:
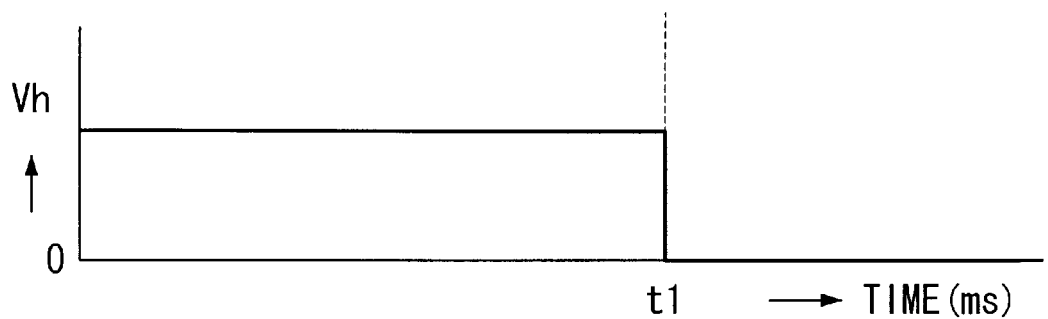
Figure 22:
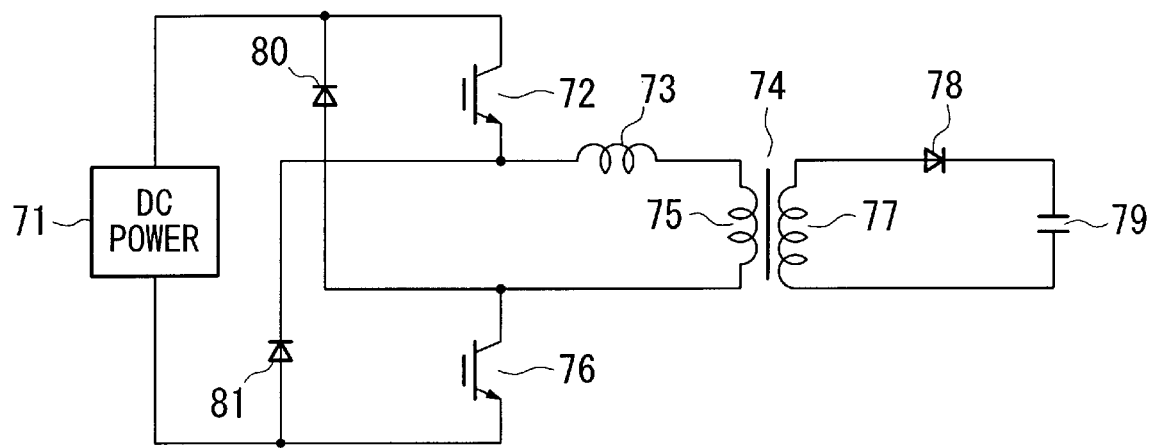
FIG. 22 is a diagram showing a conventional resonant charging-type capacitor charging apparatus.

A resonant charging capacitor charging apparatus according to a fifth embodiment of the present invention will be explained based on FIG. 7. In FIG. 7, the same reference numerals as those in FIG. 19 represent corresponding components. In the fifth embodiment, cathodes of two diodes 16 and 17, provided on either side of the secondary winding of the transformer 6 of the capacitor charging apparatus, are connected in series facing each other, and a switching element 18 for short circuiting is connected to this series connection point and between the negative dc terminals of the rectifier 7. The detect voltage Vd is split to a differentiating circuit 19 which calculates the voltage boost rate dVd/dt, and the differentiating signal (dVd/dt), output from the differentiating circuit 19, is applied to a multiplier 20. The multiplier 20 multiplies the differentiating signal (dVd/dt) by a signal representing the operating delay td of the switching element 18, and outputs a signal (td×dVd/dt) to an adder 61.

Here, (td×dVd/dt) shows the voltage boost portion vc of the charge voltage Vc of the load capacitor 8 in the operating delay td of the switching element 18, and the multiplier 20 outputs a signal vd, which is obtained by multiplying the voltage boost portion vc by the divided rate of the voltage division resistances 9 and 10 for detecting charge voltage. The adder 61 adds the signal vd to the detect voltage Vd, and outputs a predicted charge voltage signal Vd'=(Vd+vd). The predicted charge voltage signal Vd' is a charge voltage predicted after the operating delay td of the switching element 18. The voltage comparator 11 compares the predicted charge voltage signal Vd' with the reference voltage Vr of the reference voltage source 12, and, when Vd'>Vr, the voltage comparator 11 outputs the compare signal Vh at the L level. When Vd' <Vr, the voltage comparator 11 outputs the compare signal Vh at the H level, switching ON the inverter 2 and switching OFF the switching element 18.

A pulse generator 62 connects to the output of the voltage comparator 11, and, when the compare signal Vh is at the L level, the pulse generator 62 supplies a pulse having a predetermined width to the control electrode of the switching element 18. Various types of semiconductor switches such as an FET, IGBT, IEGT, and a thyristor, can be used as the switching element 18. In particular, a semiconductor element without an active turn-off function, such as an SCR (silicon controlled rectifier) can be used for reasons that will be explained later. In the case where there is a high charge voltage of several kV which exceeds the voltage tolerance of ordinary semiconductor elements, the switching element 18 may be comprised of a necessary number of these elements connected in series. The present invention does not pertain to this series circuit and a method for driving it, and since this is conventional technology, it will not be explained in great detail. The width of the pulse of the pulse generator 62 may continue until the switching element 18 turns ON again.

Figure 8A:
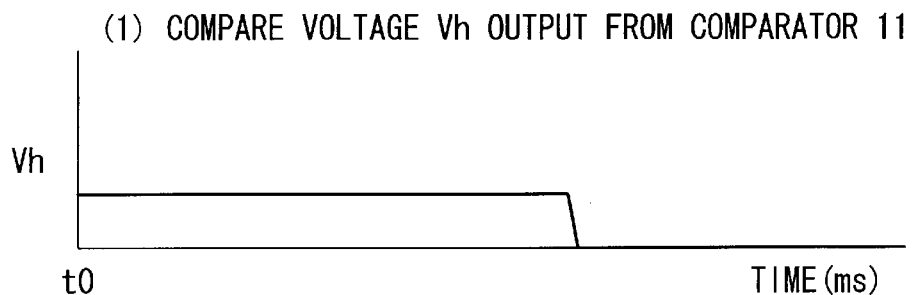
FIGS. 8A to 8D are diagrams showing current and voltage waveforms to explain the operation of FIG. 7.
Figure 8B:
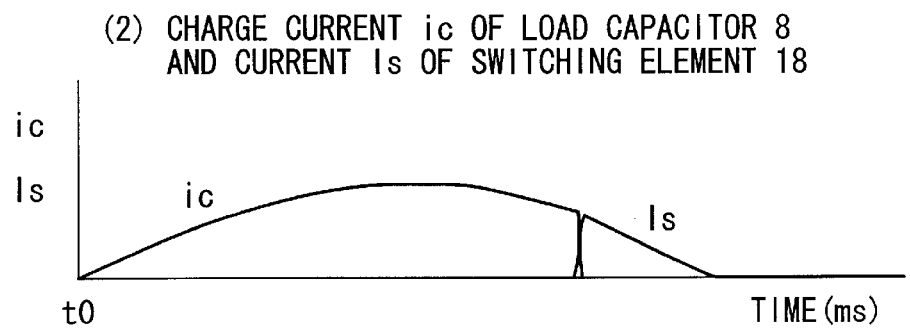
Figure 8C:
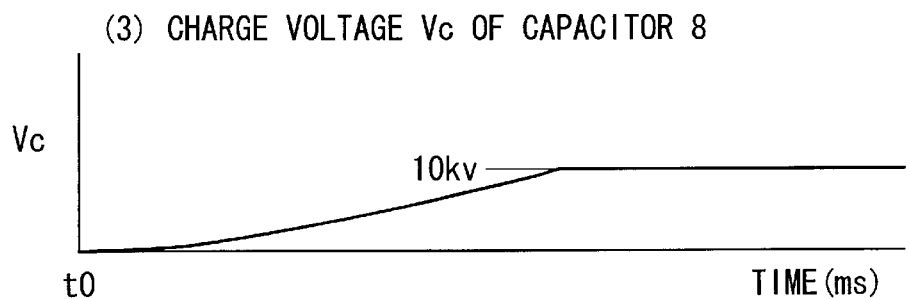
Figure 8D:
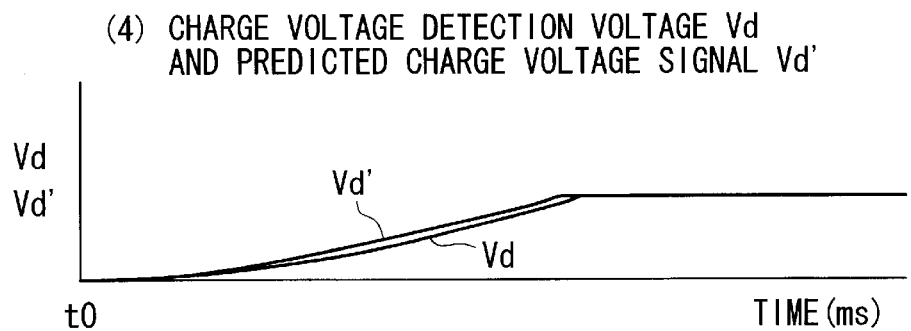
Figure 9A:
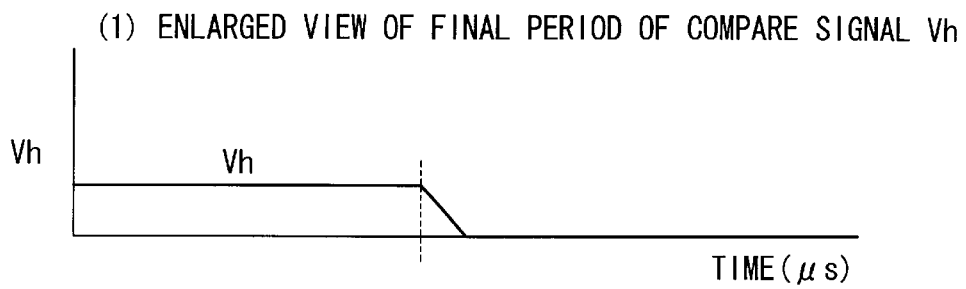
FIGS. 9A to 9D are diagrams showing current and voltage waveforms at the charge end point to explain the operation of FIG. 7.
Figure 9B:
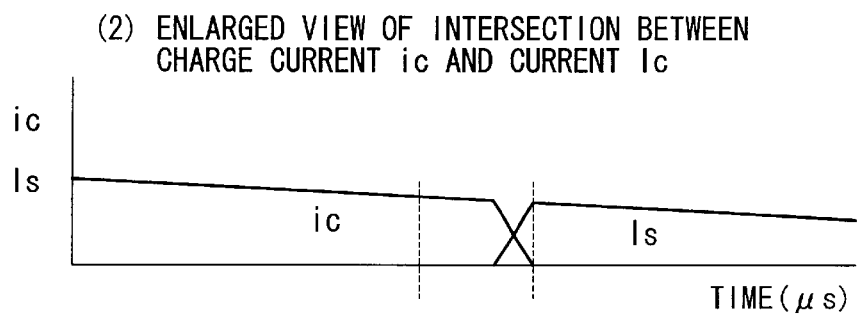
Figure 9C:
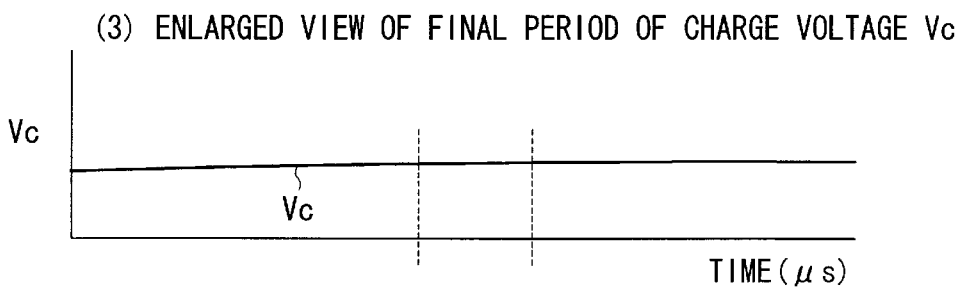
Figure 9D:
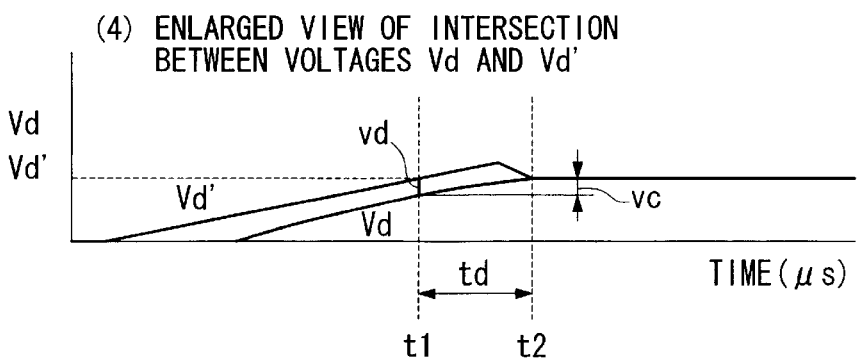

Subsequently, the operation of this embodiment will be explained further by using FIGS. 8A to 8D, and FIGS. 9A to 9D. FIGS. 8A to 8D shows one complete charge cycle, and FIGS. 9A to 9D shows the final charge period in enlargement. The symbols (1) of FIGS. 8A and 9A show the compare signal Vh of the voltage comparator 11, the symbols (2) of FIGS. 8B and 9B show the charge current ic of the load capacitor 8 and the current Is of the switching element 18, the symbols (3) of FIGS. 8C and 9C show the charge voltage Vc of the load capacitor 8, and the symbols (4) of FIGS. 8D and 9D show the detect voltage Vd and the predicted charge voltage signal Vd'.

In FIGS. 8A to 8D, the load capacitor 8 starts charging at time t0. When the predicted charge voltage signal Vd' of the sum of the detect voltage Vd and the voltage vd, which corresponds to the voltage boost portion vc of the charge voltage Vc of the load capacitor 8, is lower than the reference voltage Vr, the voltage comparator 11 outputs the compare signal Vh at the H level, whereby the A-phase signal of the inverter controller 13 passes the AND gate 14, switching ON the pair of IGBTs 4A and 4D on the opposite angle of the inverter 2. Consequently, the dc power supply voltage is applied to the resonant circuit and the resonance produces a current, boosting the charge voltage Vc of the load capacitor 8 toward the target voltage 10 kV as shown by the symbol (3) of FIG. 8C. Since the compare signal Vh is at the H level at this time, the pulse generator 62 does not output an ON signal, and the switching element 18 remains OFF. As shown by the symbol (4) of FIG. 8D, the detect voltage Vd and the predicted charge voltage signal Vd' are boosted with a difference of voltage vd therebetween.

In FIGS. 9A to 9D, when the charge voltage Vc of the load capacitor 8 is just before the target of 10 kV at time t1 and the predicted charge voltage signal Vd', which is higher than the detect voltage Vd by the voltage vd, exceeds the reference voltage Vr, the compare signal Vh of the voltage comparator 11 drops to the L level, and the AND gate 14 blocks the gate signal from being transmitted to the pair of IGBTs 4A and 4D, switching them OFF. Simultaneously, the pulse generator 62 is triggered by the change of the compare signal Vh from H to L, and applies a pulse to the control electrode of the switching element 18, switching ON the switching element 18 and short-circuiting the secondary winding side of the transformer 6. The charge voltage Vc of the load capacitor 8 increases during the operating delay td from time t1 until time 2, at which the secondary side of the transformer 6 is completely short-circuited. The time from t1 to t2 corresponds to the operating delay of the switching element 18 itself and the operating delay of the drive circuits of the switching element 18. Since the boost portion vc of the charge voltage Vc is calculated beforehand, the final charge voltage is extremely close to the target of 10 kV. Even when there is fluctuation in the power voltage and the residual voltage, and changes in the winding resistances in each charge cycle, this operation achieves high voltage stability in view of the fact that the voltage boost rate is always calculated. That is, increase vc in the charge voltage of the load capacitor 8 during the operating delay time td from the issue of the command to stop charging until the charges stops is calculated and predicted, and the command to stop charging is generated based on this prediction, enabling the load capacitor to be charged with extremely high accuracy.

Figure 10:
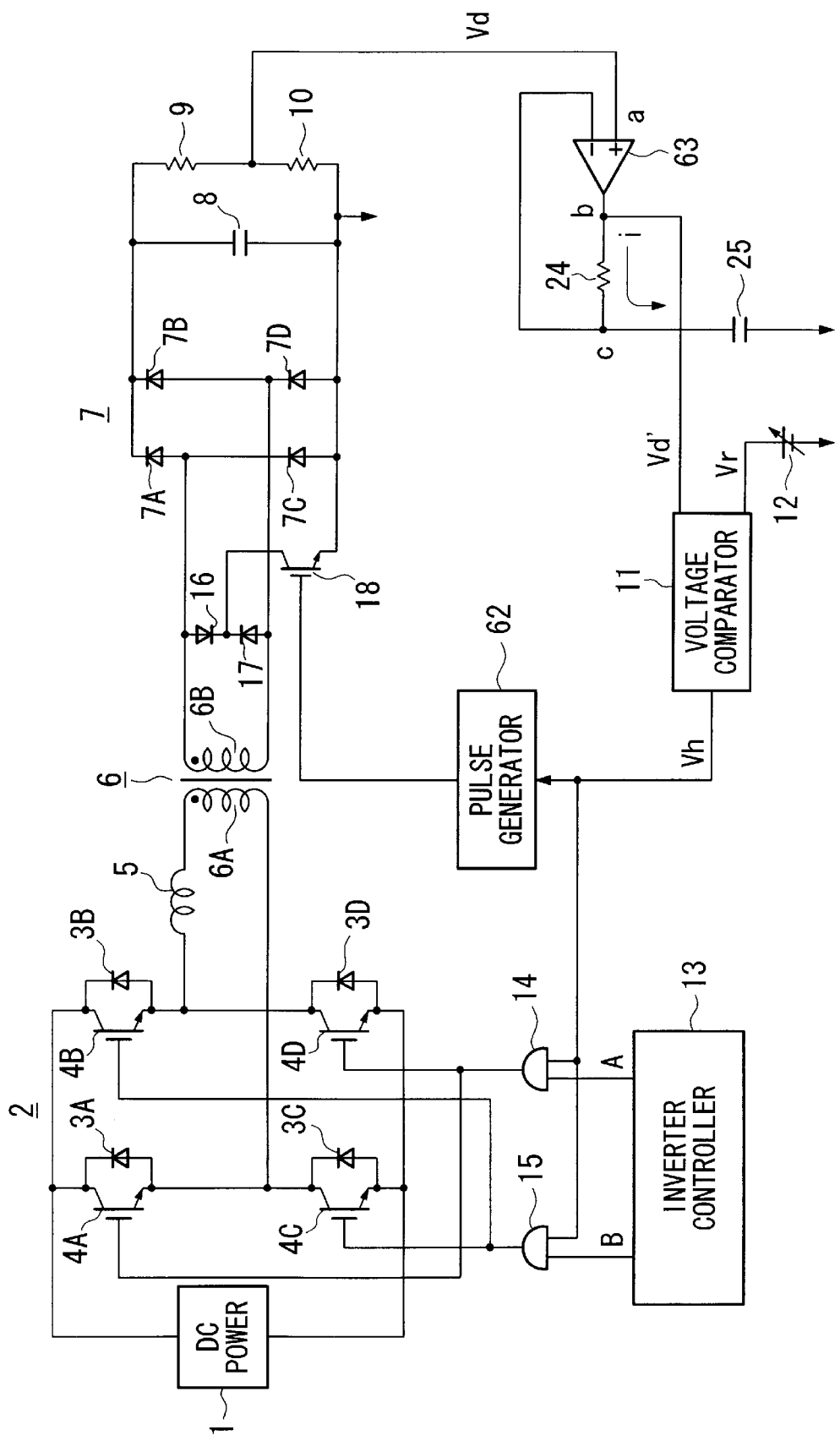
FIG. 10 is a circuit diagram showing another constitution of a capacitor charging apparatus according to a fifth embodiment of the present invention.

FIG. 10 shows an embodiment comprising an analog circuit as an arithmetic circuit. This circuit calculates the predicted charge voltage signal Vd' by calculating the voltage boost rate from the detect voltage Vd of the load capacitor 8. In other words, the analog circuit calculates Vd'=Vd+td×(dVd/dt). The detect voltage Vd is input to point "a" of the non-inverting terminal of an operational amplifier 63. The output point b of the operational amplifier 63 is connected to a capacitor 25 via a resistance 24. The connection point c of the capacitor 25 and the resistance 24 connects to the inverting terminal of the operational amplifier 63. The output point b of the operational amplifier 63 also connects to the voltage comparator 11, which compares it with the reference voltage Vr.

Subsequently, the operation of this circuit will be explained. The detect voltage Vd is input to the non-inverting terminal of the operational amplifier 63, and the connection point c of the capacitor 25 and the resistance 24 connects to the non-inverting terminal, forming a feedback. Therefore, viewed from point "a", the voltage of the point c becomes the voltage when the operational amplifier 63 has functioned simply as a buffer, and the capacitor 25 is kept charged at the detect voltage Vd. Consequently, the charge current i of the capacitor 25 flows to the resistance 24 of resistance R. Therefore, the voltage Vb at the point b is higher than the detect voltage Vd at the point c by an amount equivalent to the decrease in voltage of the resistance 24, i.e. Vb=Vd+i×R. When the capacitance of the capacitor 25 is expressed as Cd, i=Cd×(dVd/dt), and it follows that Vb=Vd+Cd×R×(dVd/dt). With a setting of Cd×R=td, Vb=Vd+td×(dVd/dt). Hence the calculation is Vb=Vd'=Vd+td×(dVd/dt).

Subsequently, a design example will be explained more specifically. Based on the above equation, the capacity Cd of the capacitor 25 is expressed as Cd=i/(dVd/dt), and when the output current i of the operational amplifier 63 is 10 mA, based on the current capability of the operational amplifier 63, the charge time is 100 µs, and the detect voltage Vd for the set charge voltage 10 kV of the load capacitor 8 is 10 V, then dVd/dt becomes 100 kV/s. Therefore, the capacity of the capacitor 25 is 100 nF; i.e. Cd=100 nF. Furthermore, when the operating delay td is set at 1 µs in order to simplify the calculation, the resistance value R of the resistance 24 is calculated by Cd×R=td, giving a result of 10 Ohms. The predicted charge voltage signal Vd' is calculated from these numerical values. The predicted charge voltage signal Vd' is supplied to the voltage comparator 11, which compares it with the reference voltage Vr.

Embodiment 6

Figure 11:
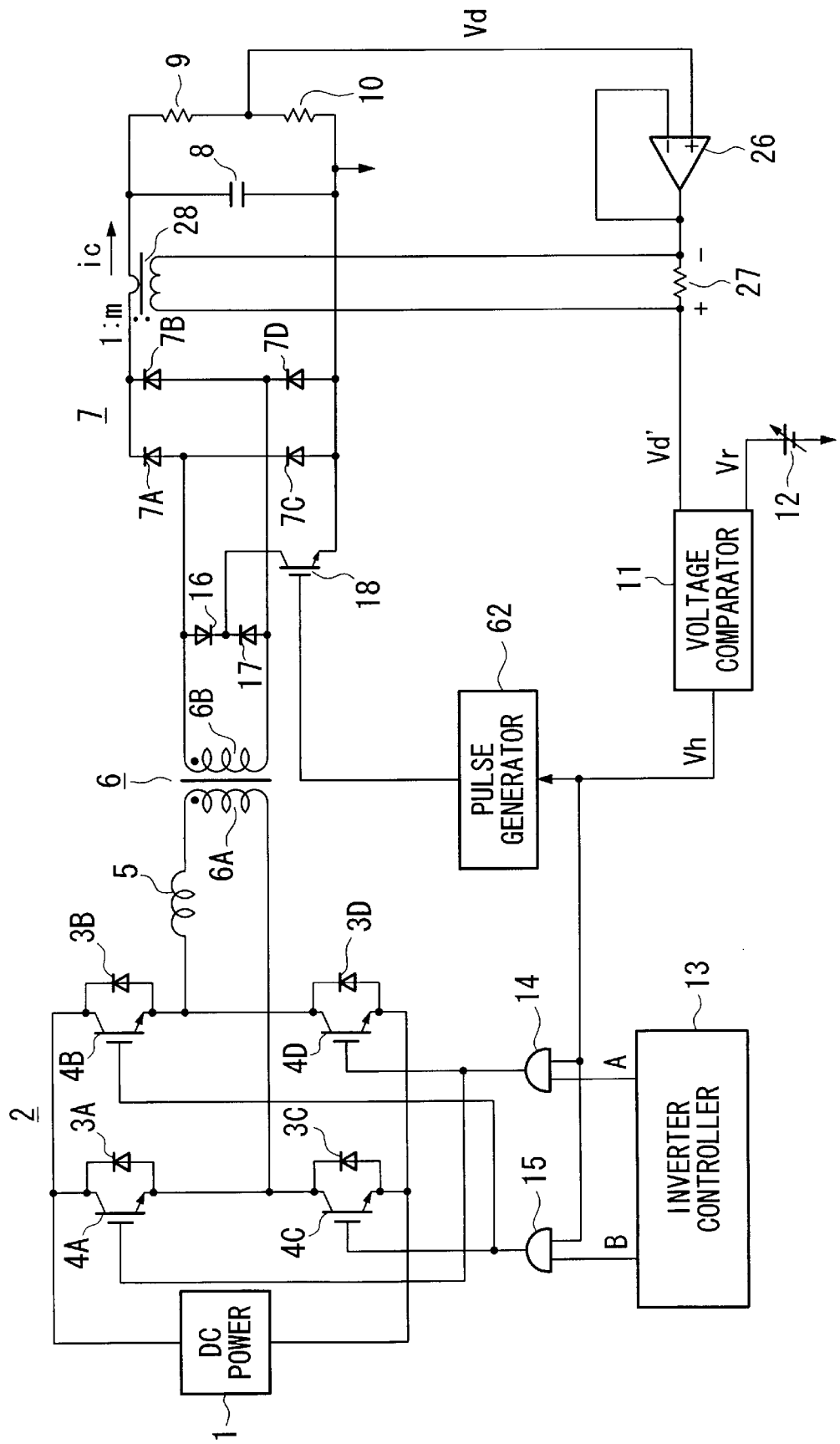
FIG. 11 is a circuit diagram showing the constitution of a capacitor charging apparatus according to a sixth embodiment of the present invention.

FIG. 11 shows another embodiment in which the voltage boost rate of the charge voltage Vc of the load capacitor 8 is calculated by the equation shown below. The charge voltage Vc' after the delay td of the charge voltage Vc of the load capacitor 8 becomes Vc'=Vc+td (dVc/dt)=Vc+td (ic/C). The voltage boost rate can be determined by detecting the charge current ic of the load capacitor 8 and dividing by the capacity C of the load capacitor. Reference numeral 26 represents a buffer operational amplifier which receives the detect voltage Vd of the load capacitor 8 at a non-inverting terminal. The output of the operational amplifier 26 is supplied to the voltage comparator 11 via a resistance 27. Reference numeral 28 represents a current transformer which detects the charge current ic. The primary winding of the current transformer 28 comprises one turn, and the secondary winding comprises m turns. The black dots show the polarity of the windings. The current detected by the current transformer 28 is applied to the resistance 27, and converted to a voltage (ic×R/m) having the polarity shown in FIG. 11. The conditions for satisfying the above equation in this circuit will be explained. When the dividing ratio {R2/(R1+R2)} of the voltage division resistances for detecting charge voltage 9 (resistance value R1) and 10 (resistance value R2) is 1/n, the charge voltage Vc is detected at 1/n; dividing both sides of the above equation by n gives Vc'/n=Vc/n+td (ic/C)/n. Since the detect voltage of the charge voltage Vc is detect voltage Vd, the detect voltage Vd' after the delay td is Vd'/=Vd+td (ic/C)/n. When ic×R/m=td (ic/C)/n, the resistance value R of the resistance 27 becomes R=(td×m)/(C×n). When this equation is satisfied, as shown in FIG. 11, the conversion voltage (ic×R/m) is added to the detect voltage Vd, and the predicted charge voltage signal Vd' is input to the voltage comparator 11.

More specifically, when td=1 µs, n=1000, m=100, and C=50 nF, the resistance value R of 2 Ohms is calculated from the above equation. Therefore, the predicted charge voltage can be controlled by setting the resistance value R of the resistance 27 at 2 Ohms and applying the predicted charge voltage signal Vd' to the voltage comparator 11. The charge current ic can be detected by using Hall CT. Furthermore, even when the voltage between both ends of the resistance 27 is added to the reference voltage Vr of the reference voltage source 12 at inverse polarity (inverse to FIG. 11), the conditions of the changes in the output of the voltage comparator 11 are identical, enabling the predicted charge voltage to be controlled in the same manner as above. Provided that the equation Vd+td (dVd/dt)=Vr is satisfied, the load capacitor 8 can be charged with extremely high accuracy.

The fifth and sixth embodiments described above are entirely comprised of analog circuits, but they can also be processed by digital calculation. For example, the voltage boost rate can be calculated easily by holding a sampling value in each clock cycle and determining the difference with the sampling value from the immediately preceding clock cycle.

In the fifth and sixth embodiments of the present invention, a switching element is added, making it possible to easily calculate the amount of overcharging due to inertial current, generated by the inductance of the circuit. Furthermore, since the calculation parameters feature a voltage boost rate which incorporates all factors such as fluctuation in the power supply voltage, which is a principle cause of fluctuation in the charge voltage, the residual voltage of the load capacitor, and the like, the charge voltage can be easily and reliably predicted, achieving an extremely accurate level of stability in the capacitor charge voltage of the excimer laser power.

Incidentally, the connection of the switching element is not limited to that mentioned in the above embodiments. Specifically, the connection may be the same as those in the first to fourth embodiments (Patent Application No. 2000-193063). In either case, it is necessary only that the switching element is provided on the secondary side of the transformer in a position which allows energy from the secondary winding of the transformer to be selectively bypassed from the load capacitor.

Subsequently, FIG. 12 will be used to explain the principles shared by seventh and eighth embodiments of the present invention.

(1) When the charge which has been charged to the energy accumulating capacitor 109 is abruptly discharged and a pulse current is supplied to an unillustrated load apparatus, a sensor of the load apparatus detects this state, and a computer 125, which is attached to the load apparatus, calculates the charge voltage of the energy accumulating capacitor 109 which matches the load conditions in the subsequent charge cycle, whereby a new charge voltage is set.

(2) The resonant effect of resonant inductance and resonant capacity is generated cyclically, the resonant effect being started prior to setting the new charge voltage in order to accelerate the charging of the energy accumulating capacitor 109, and the energy accumulating capacitor 109 is charged to a predetermined constant voltage.

(3) When the energy accumulating capacitor 109 is charged to a predetermined constant voltage, the resonance is interrupted and the resonant current ceases to flow. The energy which has been accumulated in the resonant inductance is held in circulation until the new setting is completed.

(4) When the new setting is completed while circulating the energy accumulated in the resonant inductance, the resonance restarts and the resonant current from the dc power 101 is again supplied to the energy accumulating capacitor 109, charging the energy accumulating capacitor 109 to a predetermined voltage.

In the seventh and eighth embodiments, after the charge of the energy accumulating capacitor 109 has been discharged to the load, before completing the new setting of the subsequent charge cycle, the energy accumulating capacitor 109 is charged to an intermediate voltage, corresponding to a minimum use voltage, and the energy which has accumulated in the resonant inductance is held by circulation until the new setting is completed; therefore, when the new setting is completed, the resonant current can be immediately supplied to the energy accumulating capacitor 109, charging the load capacitor to the newly set voltage at high-speed in each cycle.

Embodiment 7

Figure 12:
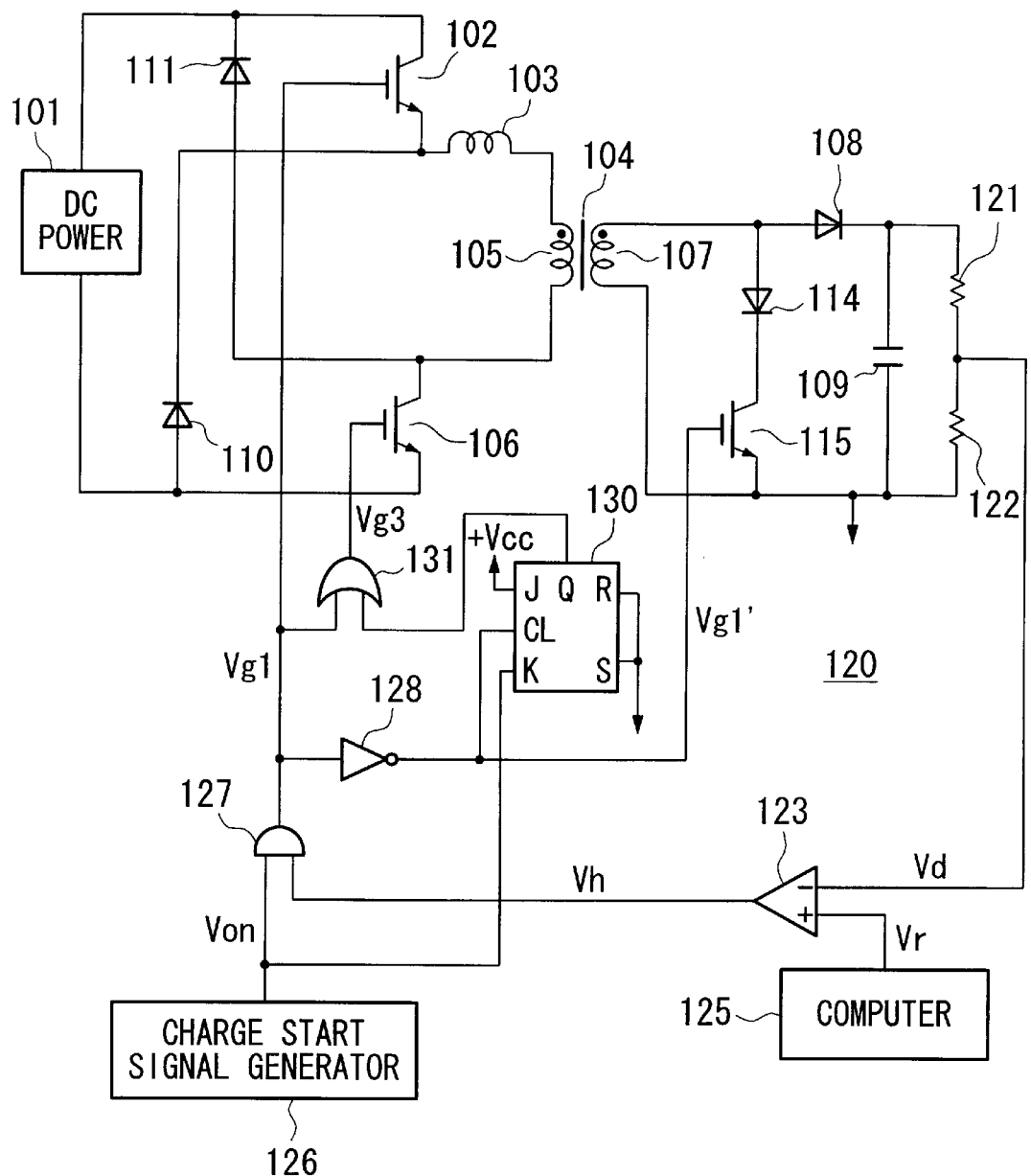
FIG. 12 is a circuit diagram showing the constitution of a resonant charging-type capacitor charging apparatus according to a seventh embodiment of the present invention.

FIG. 12 shows one example of the constitution of a resonant charging-type capacitor charging apparatus according to the seventh embodiment of the present invention. A first semiconductor switch 102, a resonant inductance circuit 103, a primary winding 105 of a transformer 104, and a second semiconductor switch 106 are connected in series from a dc power 101, comprising a commercial ac power and a rectifier or the like. The energy accumulating capacitor 109 is connected to the secondary winding 107 of the transformer 104 via a rectifying diode 108, which prevents reverse current flow. Feedback diodes 110 and 111 are connected from the emitters and collectors of the first and second semiconductor switches 102 and 106 to the dc power 101. A diode for preventing reverse flow 114 and a third semiconductor switch 115 are also connected so as to short-circuit the secondary winding 107 of the transformer 104.

The controller 120 comprises the following components. Reference numerals 121 and 122 represents voltage division resistances for detecting charge voltage which convert the charge voltage 10 kV of the energy accumulating capacitor 109 to, for example, a detect voltage Vd of several V. Reference numeral 123 represents a comparator which compares the detect voltage Vd with a reference voltage Vr from a computer 125 of an unillustrated load apparatus. The reference voltage Vr charges in two stages comprising a constant reference voltage Vr0, which is predetermined in correspondence the intermediate voltage, and a variable reference voltage Vrn (n=1, 2, 3, . . . ) which varies in correspondence with the final target charge voltage, newly set in each charge cycle. The variable reference voltage Vrn is detected by a sensor of an unillustrated load apparatus, such as an excimer laser, and is calculated by the computer 125 in each charge cycle based on the load conditions. However, in an actual apparatus, there is a delay between the discharge of the energy accumulating capacitor 109 and the calculation and setting of the variable reference voltage Vrn, that is, between the switch from the constant reference voltage Vr0 to the variable reference voltage Vrn.

The comparator 123 outputs the compare signal Vh at the H level when the detect voltage Vd is lower than the reference voltage Vr, and at the L level when the detect voltage Vd is higher than the reference voltage Vr. Reference numeral 126 represents a charge start signal generator which generates a charge start signal Von comprising, for example, a repeated signal at 4 kHz having a pulse width of 150 $\mu$s. Reference numeral 127 represents an AND circuit, which switches ON the semiconductor switches 102 and 106 by generating an H-level output signal Vg1 when the charge start signal Von and the compare signal Vh are both at the H level. Reference numeral 128 represents an inverter which inverts the output signal Vg1 of the AND circuit 127 and outputs a signal Vg1'. A flip-flop 130 comprises a J-K master-slave flip-flop such as a Toshiba TC4027 Integrated Circuit, the J input connecting to a control voltage of the H level of the control power Vcc, and the R and S inputs connecting to the L level (ground). The signal Vg1', which is obtained by inverting the output signal Vg1, is input to the CL input, and the charge start signal Von is input to the K input. Due to these connections, when the charge start signal Von is at the L level, a Q signal is unconditionally at the L level. When the signal Von rises to the H level, the Q signal changes from its previous status to another status at the rise of the signal Vg1' to the CL input. The Q signal becomes one of the inputs to an OR circuit 131. The controller 120 controls the second semiconductor switch 106 by using the output Vg3 of the OR circuit 131, which receives the Q output from the flip-flop 130 and the output signal Vg1 from the AND circuit 127. The third semiconductor switch 115 is controlled by the signal Vg1', which the inverter 128 obtains by inverting the output signal Vg1. Although each of the semiconductor switches 102, 106, and 115 is shown as comprising an IGBT, other types of semiconductor switches, such as an FET, may be used instead. In FIG. 12, the gate electrodes of these semiconductor switches are connected directly to the AND and OR circuits, but in reality a signal amplifier and insulator are required. Since these circuits are already conventionally known, they will not be explained here.

Figure 13:
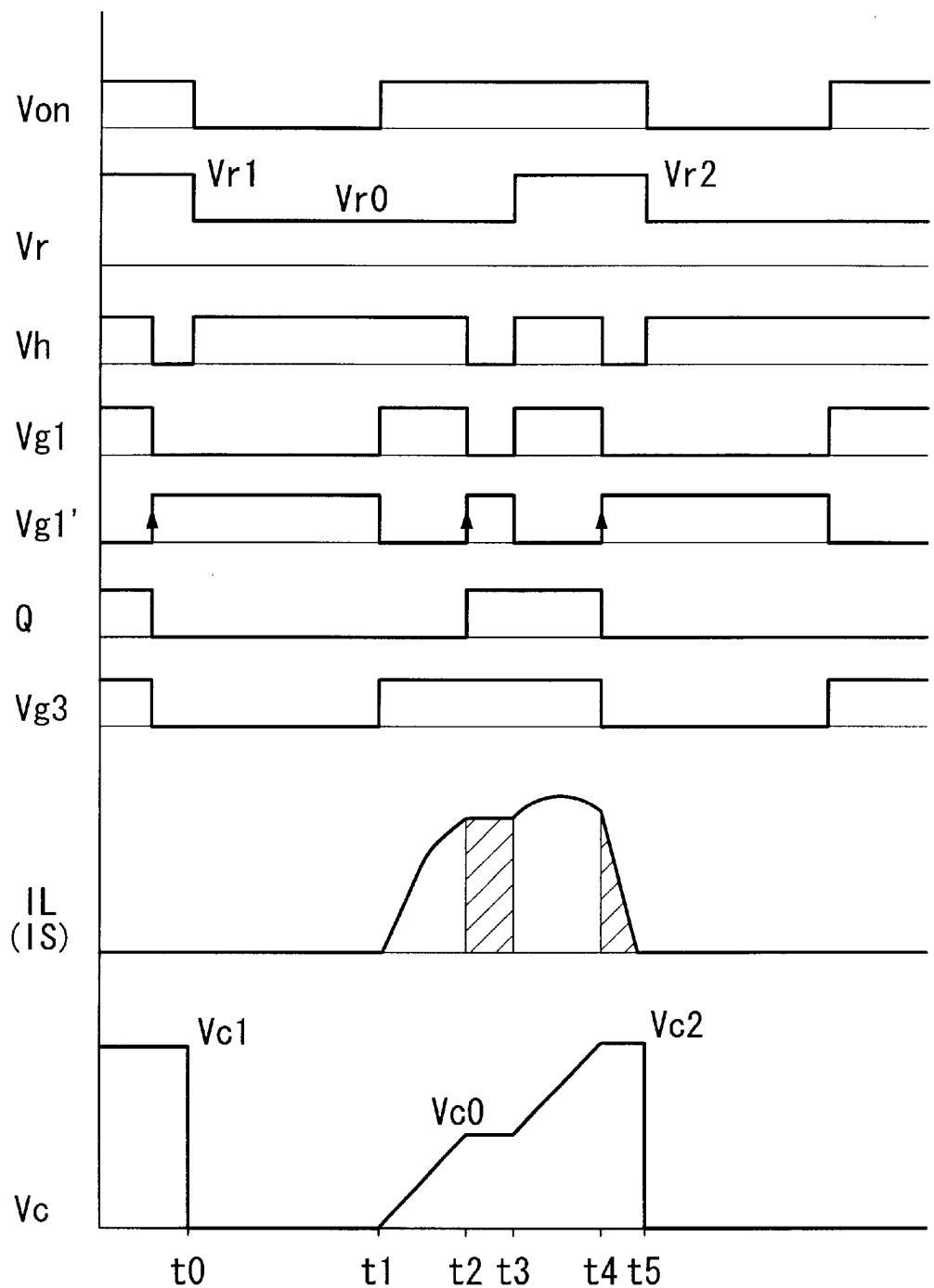
FIG. 13 is a waveform diagram to explain the operation of the apparatus shown in FIG. 12.

Subsequently, the operation in the case where the load apparatus comprises an excimer laser will be explained based on FIG. 13. Reference numerals Vc0, Vc1, and Vc2 respectively represent charge voltages of the energy accumulating capacitor 109 with respect to a constant reference voltage Vr0 and variable reference voltages Vrn (n=1) and Vrn (n=2) which are output from a controllable reference voltage source (unillustrated) provided in the computer 125. In FIG. 13, the diagonally shaded portion of the current IL flowing in the resonant inductance represents the inductance current portion which is bypassed by the third semiconductor switch 115. The same applies in the eighth embodiment explained later.

At time t0, the energy accumulating capacitor 109, which until that time was charging to the charge voltage Vc1, is discharged, generating laser light. A sensor of an unillustrated load apparatus detects the laser output, and the computer 125 of the load apparatus calculates the next set charge voltage Vc2; the time at which the reference voltage Vr is reset to the variable reference voltage Vr2 is deemed to be t3. Since the energy accumulating capacitor 109 has been discharged, the compare signal Vh of the comparator 123 is at the H level. Furthermore, the charge start signal Von is at the L level between times t0 to t1, and since the K input of the flip-flop 130 is at the L level, so is the Q signal. At this time, the reference voltage Vr is at the constant reference voltage Vr0, and the compare signal Vh of the comparator 123 is at the H level. When the charge start signal Von is generated (i.e. rises to the H level) at time t1, the output signal Vg1 of the AND circuit 127 and the compare signal Vh of the comparator 123 are at the H level, and consequently, the H-level output signal Vg1 turns ON the first semiconductor switch 102. The output signal Vg1 passes through the OR circuit 131 and becomes the H-level signal Vg3, switching ON the second semiconductor switch 106. The first and second semiconductor switches 102 and 106 are now ON, and as a result, the resonant inductance circuit 103 and the energy accumulating capacitor 109 resonate in series, whereby the resonant current IL starts to flow, charging the energy accumulating capacitor 109 equivalently to twice the power supply voltage.

When the charge voltage Vc of the energy accumulating capacitor 109 reaches the intermediate voltage Vc0 at time t2, corresponding to the predetermined constant reference voltage Vr0, the compare signal Vh of the comparator 123 drops to the L level, and so does the output signal Vg1 of the AND circuit 127, thereby switching OFF the first semiconductor switch 102. Consequently, the signal Vg1' changes to the H level, which switching ON the third semiconductor switch 115. Since the charge start signal Von applied to the K input of the flip-flop 130 is at the H level, the flip-flop 130 is triggered by the rising edge (shown by arrows in FIG. 13) of the signal Vg1', whereby the Q output rises form the L level to the H level. Even when the output signal Vg1 is at the L level, the Q output is at the H level, so that the output Vg3 of the OR circuit 131 remains at the H level, thereby keeping the second semiconductor switch 106 ON. That is, the first semiconductor switch 102 is OFF, and the second and third semiconductor switches 106 and 115 are ON. As a result, the inductance current flows from the right terminal side of the resonant inductance circuit 103, and is circulated along the following path: black-dotted terminal of the primary winding 105 of the transformer 104—black-dotted side of the secondary winding 107—diode for preventing reverse flow 114—third semiconductor switch 115—non-black-dotted side of the secondary winding 107—non-black-dotted side of the primary winding 105—second semiconductor switch 106—feedback diode 110. Therefore, ignoring circuit loss, the energy of the resonant inductance circuit 103 is held in circulation, and simultaneously, the energy accumulating capacitor 109 is not charged; consequently, the energy accumulating capacitor 109 is not over-charged. Furthermore, the charge current which was flowing to the energy accumulating capacitor 109 is cut-off, keeping the energy accumulating capacitor 109 at the intermediate voltage Vc0.

When the reference voltage Vr is increased from the constant reference voltage Vr0 to the variable reference voltage Vr2 (the new second reference voltage) at time t3, the compare signal Vh, which is output from the comparator 123, rises again to the H level. As a result, the output signal Vg1 of the AND circuit 127 rises to the H level, switching ON the first semiconductor switch 102 and keeping the second semiconductor switch 106 ON. Since the signal Vg1' holds the L level at this time, the third semiconductor switch 115 is OFF. As a result, the status returns to the resonant status immediately before the first semiconductor switch 102 switches OFF, charging the energy accumulating capacitor 109 toward the predetermined set voltage Vc2. Therefore, the circulating current which was flowing in the resonant inductance circuit 103 is shut-off. Consequently, the energy, accumulated and held in the resonant inductance circuit 103, becomes a resonant current when the first and second semiconductor switches 102 and 106 have switched ON, and once again passes through the transformer 104 and the rectifying diode 108, charging the energy accumulating capacitor 109.

At time t4, when the energy accumulating capacitor 109 has been charged to the predetermined set voltage Vc2 corresponding to the variable reference voltage Vr2, the compare signal Vh from the comparator 123 and the output signal Vg1 from the AND circuit 127 change to the L level; simultaneously, the inverter 128 changes the signal Vg1' to the H level. On the other hand, since the charge start signal Von, applied to the K input of the flip-flop 130, is still at the H level, the flip-flop 130 is triggered at the rise of the signal Vg1', and the Q output returns to the L level. As a result, the first and second semiconductor switches 102 and 106 switch OFF, and the third semiconductor switch 115 switches ON when the signal Vg1' reaches the H level. The current flowing from the right terminal side of the resonant inductance circuit 103 returns along the following path: black-dotted side of the primary winding 105 of the transformer 104, black-dotted side of the secondary winding 107, diode for preventing reverse flow 114, third semiconductor switch 115, non-black-dotted side of the secondary winding 107, non-black-dotted side of the primary winding 105, feedback diode 111, dc power 101, and feedback diode 110, thereby feeding back the energy to the dc power 101. That is, the resonant inductance current is bypassed by the third semiconductor switch 115, and does not over-charge the energy accumulating capacitor 109. Since the third semiconductor switch 115 remains ON until the next charge start signal Von, all the energy of the resonant inductance circuit 103 is fed back to the dc power 101. This embodiment can provide a highly efficient charging apparatus which is capable of increasing the accuracy of the charge voltage without over-charging the energy accumulating capacitor 109 with the current of the resonant inductance circuit 103, and can feed the excess energy of the resonant inductance circuit 103 back to the dc power 101. In this example, the resonant inductance circuit 103 also comprises the unillustrated leakage inductance of the transformer 104. Incidentally, the charge voltage of the energy accumulating capacitor 109 is maintained until time t5 by the reverse current preventative effect of the rectifying diode 108.

When the charge start signal Von changes to the L level at time t5, the energy accumulating capacitor 109 is discharged to an unillustrated load apparatus, generating laser light having an intensity corresponding to the charge voltage Vc2. Simultaneously, the K input of the flip-flop 130 changes to the L level and the Q output changes unconditionally to the L level. A sensor of the unillustrated load apparatus detects the laser light, and the computer 125 or the like calculates a new variable reference voltage Vr3 corresponding to the optimum charge voltage of the next charge cycle.

According to this embodiment, two-stage charging, in which the resonance of the resonant inductance circuit 103 and the energy accumulating capacitor 109 is temporarily stopped when a predetermined intermediate voltage is attained, and resonance is restarted when a new variable reference voltage has been set, is made possible. This embodiment solves the problem of the energy accumulating capacitor 109 being over-charged by energy which has accumulated in the resonant inductance circuit 103 when the first and second semiconductor switches 102 and 106 are OFF.

Embodiment 8

Figure 14:
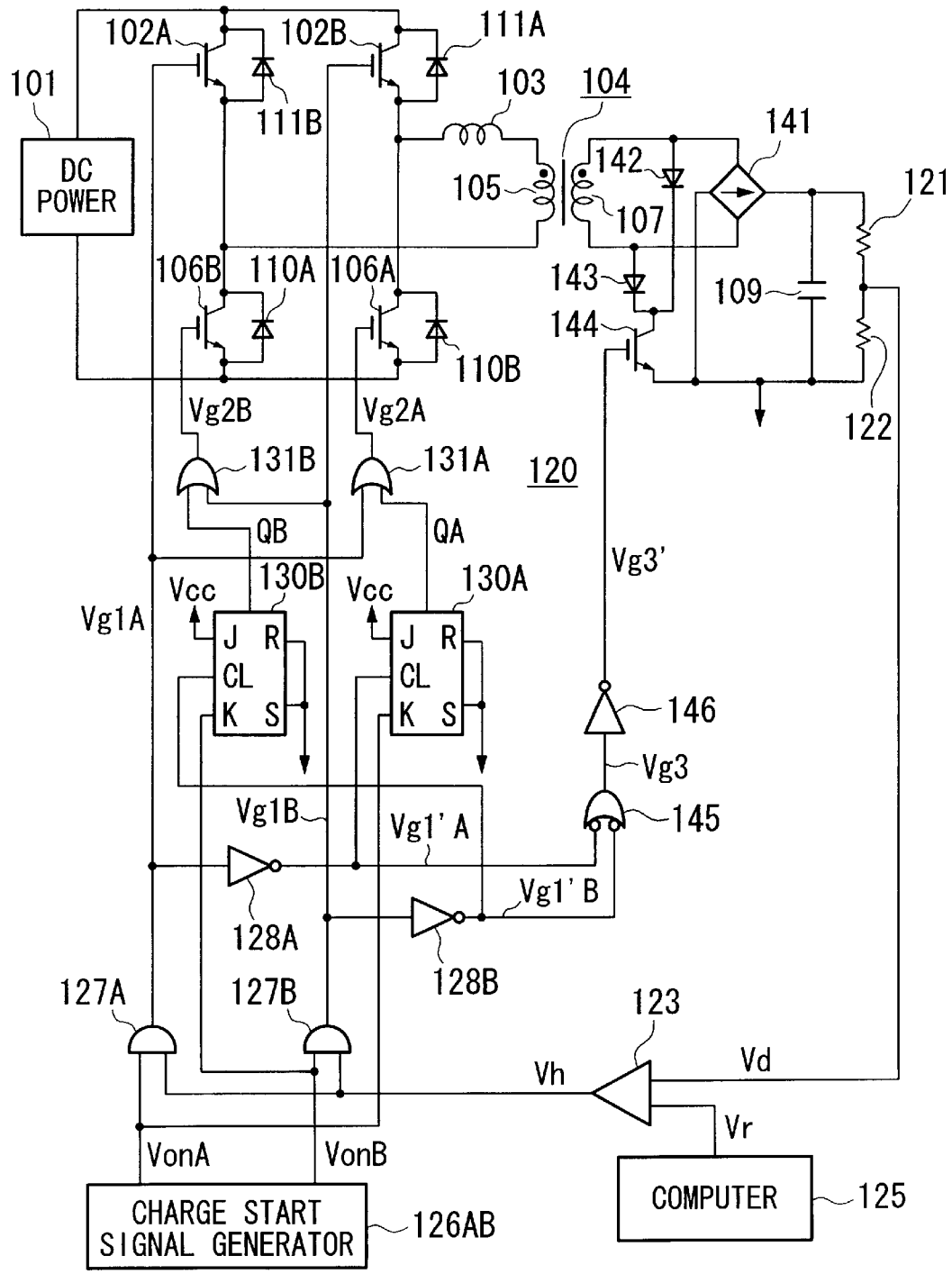
FIG. 14 is a circuit diagram showing the constitution of a resonant charging-type capacitor charging apparatus according to an eighth embodiment of the present invention.

Subsequently, FIG. 14 shows an embodiment in which this invention is applied in a bridge inverter-type resonant charger. In FIG. 14, the same reference numerals as those in FIG. 12 represent corresponding components; since A-phase and B-phase operate alternately, "A" is appended after the reference numerals of A-phase components, and "B" is appended after the reference numerals of B-phase components. For example, semiconductor switches corresponding to the in-phase first and second semiconductor switches 102 and 106 of FIG. 12 are represented by reference numerals 102A and 106A and the B-phase semiconductor switches are represented by 102B and 106B. Similarly, the phases of the feedback diodes are differentiated by reference numerals 110A and 111A, and 110B and 111B.

The A-phase semiconductor switches 102A and 106A, and the B-phase semiconductor switches 102B and 106B switch ON alternately, charging the energy accumulating capacitor 109 twice in one cycle. The transformer 104 is driven alternately. As shown in FIG. 14, the current of the resonant inductance circuit 103 is an ac current. A bridge full wave rectifier 141 is connected to the secondary winding 107 of the transformer 104, and rectifies the A- and B-phase signals, charging the energy accumulating capacitor 109. A semiconductor switch 144 for short-circuiting is connected to a common cathode terminal of the two diodes 142 and 143, which are connected in series to the secondary winding 107 with their cathodes facing each other, making the A- and B-phases common.

Figure 15:
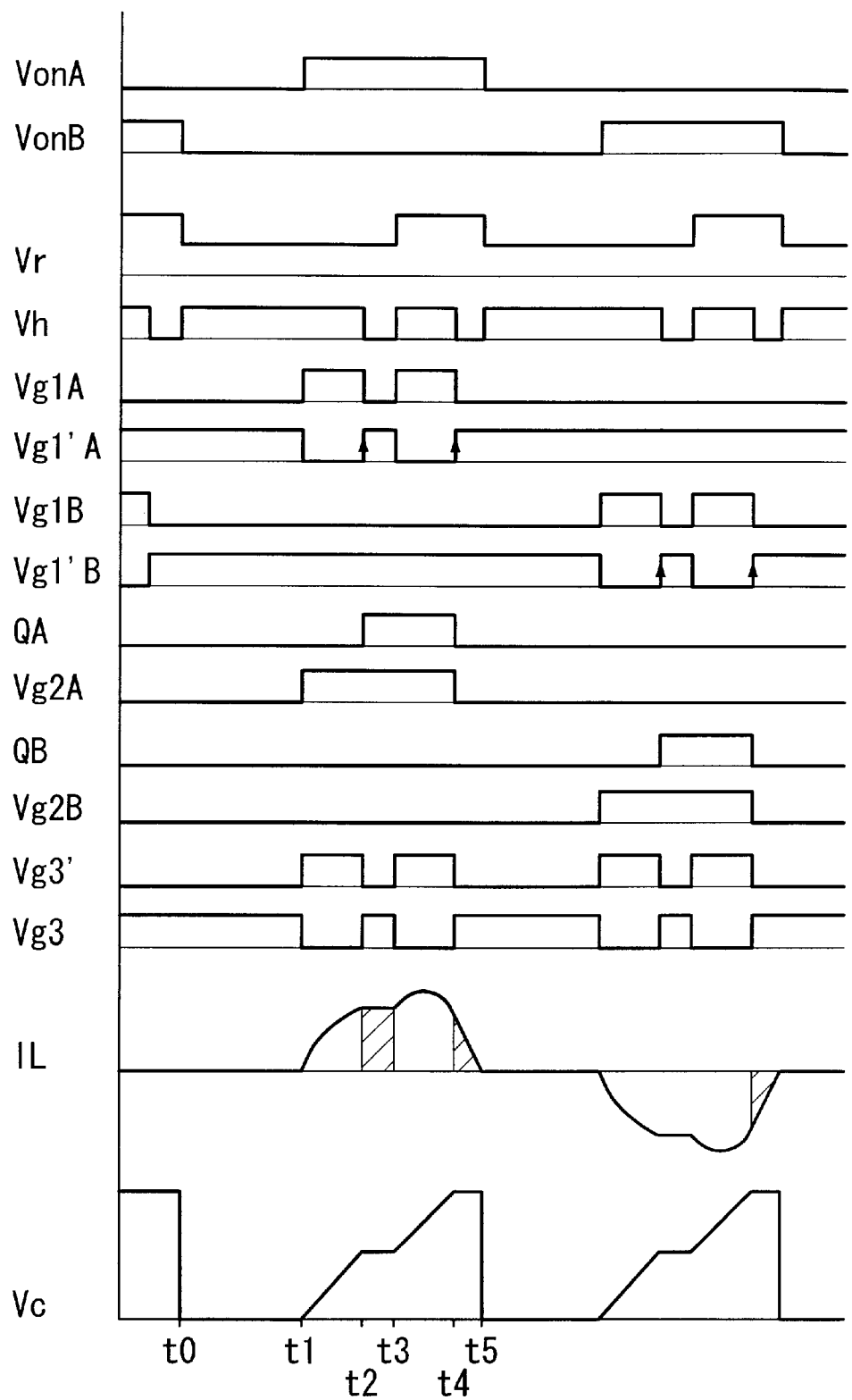
FIG. 15 is a waveform diagram to explain the operation of the apparatus shown in FIG. 14.

The charge start signal generator 126AB of the controller 120 alternately generates A- and B-phase signals VonA and VonB. A circuit corresponding to that shown in FIG. 12 is provided for each phase, and alternately drives the semiconductor switches 102A and 106A, 102B and 106B, but, since the semiconductor switch 144 is made common, a NOR circuit 145 and an inverter 146 are additionally provided. The NOR circuit 145 outputs the H level when at least one of its inputs is at the L level. A signal Vg3 is obtained by a NOR logic calculation of the signals Vg1A' and Vg1B', formed by inverting the signals Vg1A and Vg1B. The signal Vg3 is inverted by the inverter 146, obtaining a signal Vg3' which drives the semiconductor switch 144. FIG. 15 illustrates the operation, which will not be omitted here since the details are the same as the operation shown in FIGS. 12 and 13. In FIG. 15, the diagonally shaded portions of the inductance current IL represent the inductance current which is bypassed by the semiconductor switch 144 on the secondary side of the transformer 104.

In addition to the constitution described in the above embodiment, various other constitutions for the main power inverter may be envisaged, such as a half-bridge. The constitution of the controller is not limited to that of this embodiment, and may comprise a circuit for generating a drive signal which switches ON the semiconductor switch before the new variable reference voltage is set in each charge cycle, and a drive signal which switches the semiconductor switch ON/OFF in order to circulate the energy, which has accumulated in the resonant inductance, when the energy accumulating capacitor 109 has been charged to the intermediate voltage.

Embodiment 9

Figure 16:
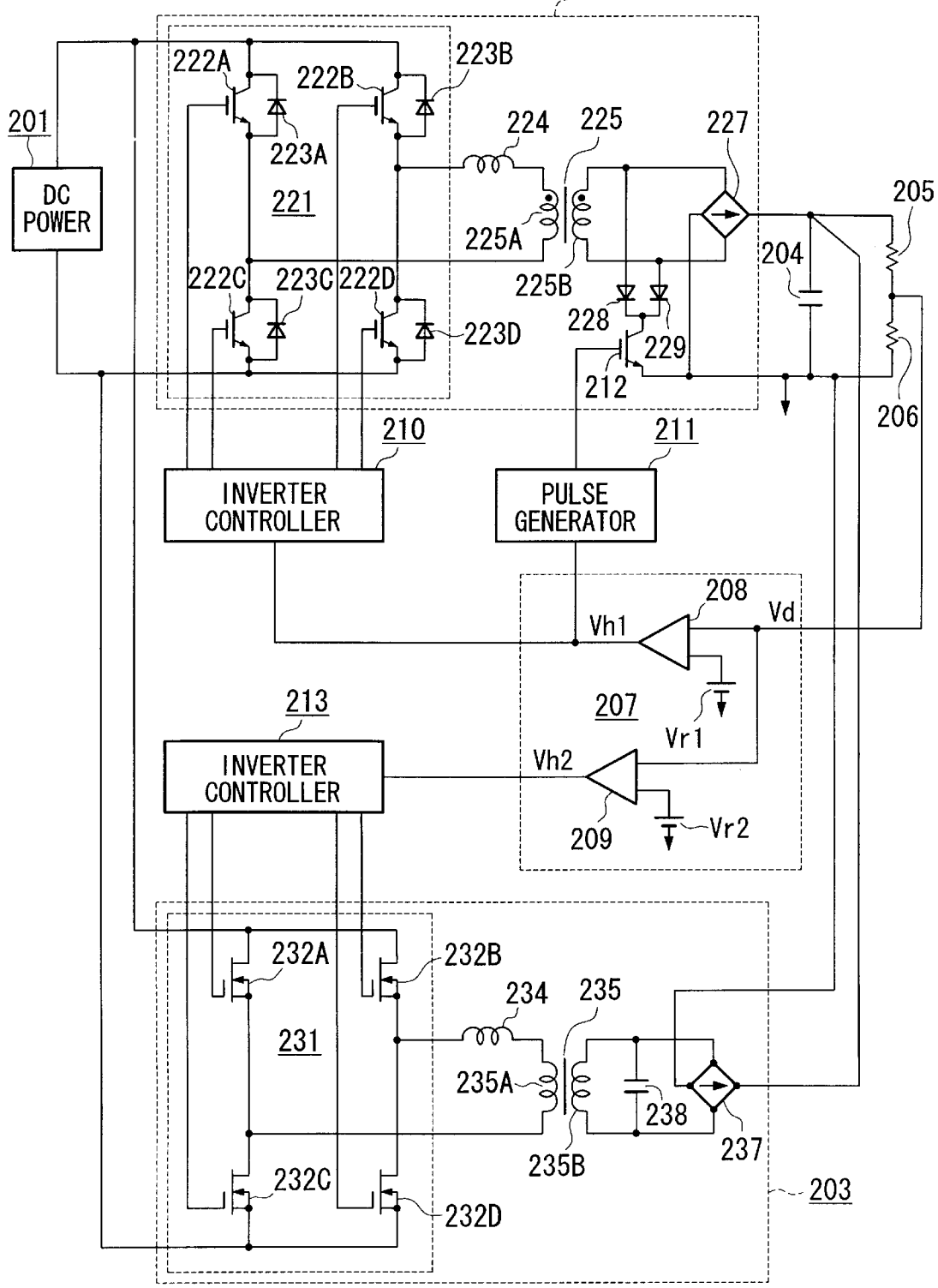
FIG. 16 is a circuit diagram showing the constitution of a capacitor charging apparatus according to a ninth embodiment of the present invention.

A resonant charging-type capacitor charging apparatus according to a ninth embodiment of this invention will be explained based on FIG. 16.

A dc power 201 comprises a commercial ac voltage rectifier or the like, and outputs to a main charger 202 and an auxiliary charger 203. The outputs of the main charger 202 and 203 are connected in parallel, and connect to the energy accumulating capacitor 204.

Resistances 205 and 206 comprises voltage division resistances for detecting charge voltage, and convert a charge voltage of, for example, 10 kV to a detect voltage Vd of several V. A controller 207 comprises two voltage comparators 208 and 209, the first voltage comparator 208 controlling an inverter of the main charger 202 by using an inverter controller 210, and controlling a bypass switch 212 by using a pulse generator 211.

The reference voltage Vr1 of the first voltage comparator 208 is set at more than 99% of a target voltage value, and, when the charge voltage of the energy accumulating capacitor 204 exceeds 99% of the target voltage value, the inverter of the main charger 202 is switched OFF and a bypass switch 212 is switched ON.

The second comparator 209 controls the inverter of the auxiliary charger 203 by using an inverter controller 213. The reference voltage Vr2 of the second voltage comparator 209 is set at 100% of the target voltage value; the inverter of the auxiliary charger 203 is switched ON when the charge voltage is less than 100% of the target voltage value, and switched OFF when the charge voltage exceeds 100% of the target voltage value.

In this embodiment, the auxiliary charger 203 operates at all times, i.e. when the charge voltage is 0% to 100% of the target voltage value, but even when the auxiliary charger 203 stops operating while the main charger 202 is operating until the charge voltage is 99% of the target voltage value, this invention is capable of achieving its target of high charge voltage accuracy of less than 0.1%.

Subsequently, the detailed constitution of the main charger 202 will be explained.

A voltage-type bridge inverter 221 is comprised of four switching semiconductor elements 222A to 222D, such as IGBTs, and reverse parallel diodes 223A to 223D, which are connected thereto. The ac side output of the high-voltage bridge inverter 221 connects to the primary winding 225A of a transformer 225 via an inductance 224, being boosted to a predetermined high voltage at the secondary winding 225B, then passing through a high-voltage rectifier 227 and connecting to the energy accumulating capacitor 204, which also functions as a resonant capacitor.

The black dots appended to the primary winding 225A and the secondary winding 225B represent the polarities of the windings. The high-voltage rectifier 227 comprises a bridge rectifier. The inductance 224 also includes an unillustrated leakage inductance of the transformer 225. Two diodes 228 and 229 are commonly connected in series with a common cathode on either side of the secondary winding 225B of the transformer 225, and a bypass switch 212 is connected between the common cathode and the negative dc terminal of the high-voltage rectifier 227.

Next, the constitution of the auxiliary charger 203 will be explained in detail.

The voltage-type bridge inverter 231 comprises four switching semiconductor elements 232A to 232D, such as FETs. When FETs are used as the switching semiconductor elements 232A to 232D, parasitic diodes can be used as the reverse-parallel diodes. The ac side output of the voltage-type bridge inverter 231 connects via an inductance 234 to the primary winding 235A of a transformer 235, being boosted to a predetermined high voltage at the secondary winding 235B, then passing through a high-voltage rectifier 237 and connecting to an energy accumulating capacitor 204. The high-voltage rectifier 237 comprises a bridge rectifier.

The voltage-type bridge inverter 231 of the auxiliary charger 203 uses an inverter having power capacity of 2% to 9%, more preferably 4% to 5%, of the power capacity of the voltage-type bridge inverter 221 of the main charger 202. The inverter may comprise a series resonant, parallel resonant, non-resonant type, and the like. In FIG. 16, the inverter is a 100 kHz parallel resonant-type comprising four FETs. A resonant capacitor 238 is connected in parallel to the secondary winding 235B of the transformer 235.

Thus, in order to achieve highly accurate charging of less than approximately 0.1%, the circuit must be a high-frequency converter-type capacitor charger in which the power capacity of the auxiliary charger is 2% to 9%, more preferably 4% to 5%, of the power capacity of the main charger.

It is possible to use an auxiliary charger which can charge with high accuracy and has a capacity of more than 10% of the capacity of the main charger, this is not very practical since the size and cost of such an auxiliary charger are greater.

The level of difference in the capacity of the auxiliary charge 203 in main charging to 99% according to this embodiment and main charging to 95% in a conventional apparatus will be calculated under following conditions.

Assuming that the energy of one laser injection is four joules, when the charge voltage is 10 kV, the capacity C of the energy accumulating capacitor is C=80 nF. In the case of a charger having a repeat load (i.e. a cycle of 250 $\mu$s) of 4 kHz, after the laser shot, when the time needed for the computer to calculate the next charge voltage is 100 $\mu$s, only 150 $\mu$s is left as the practical charge time. Using resonant charging, the energy accumulating capacitor is charged to 95% (conventional technology) and 99% (this embodiment), and then charged to 100% in the remaining 50 $\mu$s.

(1) When the main charger 202 charges to 95% (the charge voltage V of the energy accumulating capacitor=9500 V) in a charge time T=100 $\mu$s, the current I1 is calculated by the equation I1=charge voltage/T=80 nF×9500 V/100 $\mu$s=7.6 A. Therefore, the maximum power P1 during the charge time is calculated by P1=9500 V×7.6 A=72.2 kW.

Next, in charge time T=50 $\mu$s, the current I for charging the remaining 5% (of the charge voltage V of the energy accumulating capacitor=500 V) becomes I=charge voltage/T=80 nF×500 V/50 $\mu$s=0.8 A, the maximum power P2 of the auxiliary charger 203 is P2=10 kV×0.8 A=8 kW, indicating that the capacity of the auxiliary charger 203 must be more than 11% of that of the main charger 202.

(2) Similarly, when the main charger 202 charges to 99% (the charge voltage V of the energy accumulating capacitor= 9900 V) in a charge time T=100 $\mu$s, the current I2 is calculated by the equation I2=charge voltage/T=80 nF×9900 V/100 $\mu$s=7.92 A. Therefore, the maximum power P1 during the charge time is calculated by P1=9900 V×7.92 A=78.4 kW.

Next, in charge time T=50 $\mu$s, the current I for charging the remaining 1% (of the charge voltage V of the energy accumulating capacitor=100 V) becomes I=charge voltage/ T=80 nF×100 V/50 $\mu$s=0.16 A, the maximum power P2 of the auxiliary charger 203 is P2=10 kV×0.16 A=1.6 kW, and the capacity of the auxiliary charger 203 is approximately 2% of that of the main charger 202.

This shows that the auxiliary charger 203 need only have a small capacity of 20%, in contrast with that when the main charger charges to 95%.

That is, when the main charger 202 charges to more than 99%, the capacity of the auxiliary charger 203 need only be several % lower than that of the main charger 202, enabling the auxiliary charger 203 to be smaller and more economical than when charging to 95%.

Figure 17:
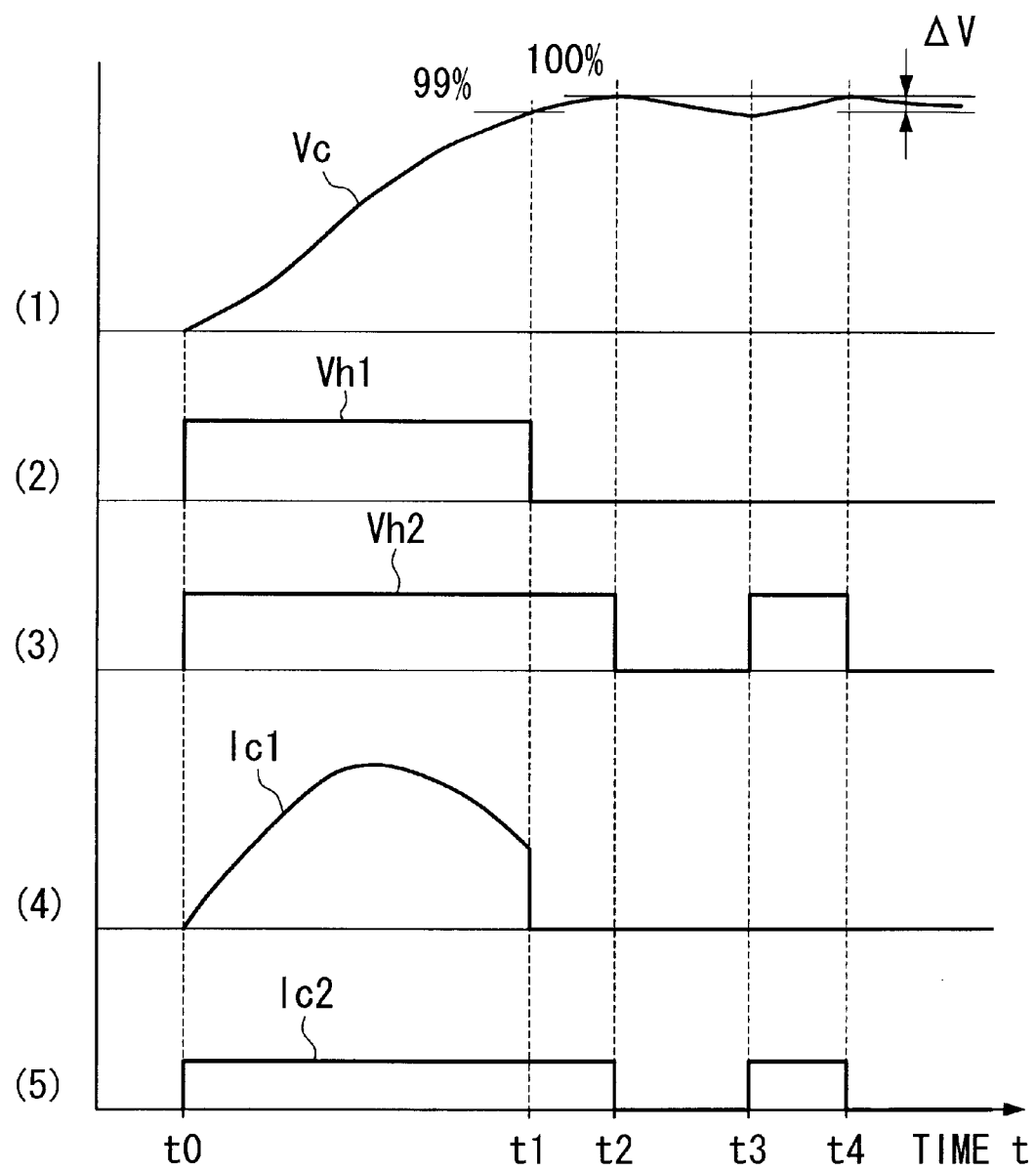
FIG. 17 is a diagram showing current and voltage waveforms to explain the operation of the apparatus of FIG. 16.

Subsequently, the operation of this embodiment will be explained based on FIGS. 16 and 17. In FIG. 17, symbol (1) represents the charge voltage Vc of the energy accumulating capacitor, symbol (2) represents the compare signal Vh1 of the first voltage comparator 208, symbol (3) represents the compare signal Vh2 of the second voltage comparator 209, symbol (4) represents the capacitor charge current Ic1 of the main charger 202, and symbol (5) represents the capacitor charge current Ic2 of the auxiliary charger 203.

The charging of the energy accumulating capacitor 204 starts at time t0 in FIG. 17. Since the detect voltage Vd is lower than the first reference voltage Vr1 and the second reference voltage Vr2, the first and second comparators 208 and 209 both output compare signals Vh1 and Vh2 at the H level, switching ON the chargers 202 and 203 and charging the energy accumulating capacitor 204.

When the charge voltage reaches 99% of the target voltage at time t1, the compare signal Vh, which is output from the first voltage comparator 208, falls to the L level, switching OFF the main charger 202. The second voltage comparator 209 continues to output at the H level, and the auxiliary charger 203 continues charging to 100% of the target voltage.

When the charge voltage reaches 100% of the target voltage, the output of the second comparator 209 changes to the L level, and the auxiliary charger 203 stops charging. Thereafter, when the energy accumulating capacitor 204 is discharged to a detect resistance and the like in the circuit, and there is a period of time before the next laser shot, e.g. when the charge voltage falls below the target charge voltage at time t3, the compare signal Vh2, which is output by the second comparator 209, rises again to the H level, whereby the auxiliary charger 203 switches ON again and auxiliarily charges to 100% of the target voltage. When 100% of the target is achieved at time t4, the auxiliary charger 203 switches OFF and stops auxiliary charging.

In the case where the load comprises an excimer laser or the like, there is usually a long period of time from charging the load capacitor until the next laser shot. Since the load capacitor is discharged by a high-voltage detect resistor and the like during that time, decreasing its voltage, the load capacitor requires auxiliary charging.

In this embodiment, since the auxiliary charger 203 has a small capacity of several % of the capacity of the main charger 202, the auxiliary charger 203 boosts the charge voltage only slightly, reducing the size of the ripple $\Delta$V. In other words, it becomes easier to control the charge voltage of the energy accumulating capacitor 204, and the voltage accuracy can be increased to less than approximately 0.1%. In FIG. 17, the ripple section is enlarged in order to show the operation clearly.

In this embodiment, the provision of the bypass switch 228 enables the charge voltage of the main charger 202 to be set at 99% of the target voltage, and the auxiliary charger 203 subsequently charges with high accuracy to 100% of the target voltage. Therefore, the charge voltage can be controlled easily and reliably over a long time period while increasing the voltage stability of the energy accumulating capacitor, such as an excimer laser source, to an accuracy of less than approximately 0.1%.

By using a resonant charger as the main charger, the control circuit can be made simpler, achieving a small-scale and highly efficient capacitor charging apparatus.

Furthermore, by using a series resonant or parallel resonant circuit as the main high-frequency converter-type auxiliary charger, the control circuit can be simplified, achieving a small-scale and highly efficient capacitor charging apparatus.

Embodiment 10

Each of the embodiments described above comprises a capacitor charging apparatus having an inverter and a transformer, but the present invention is not limited to such a constitution. For example, a switching regulator may be used as described below. This constitution also realizes the same capacitor charging apparatus and same advantages as the above embodiments.

Figure 18:
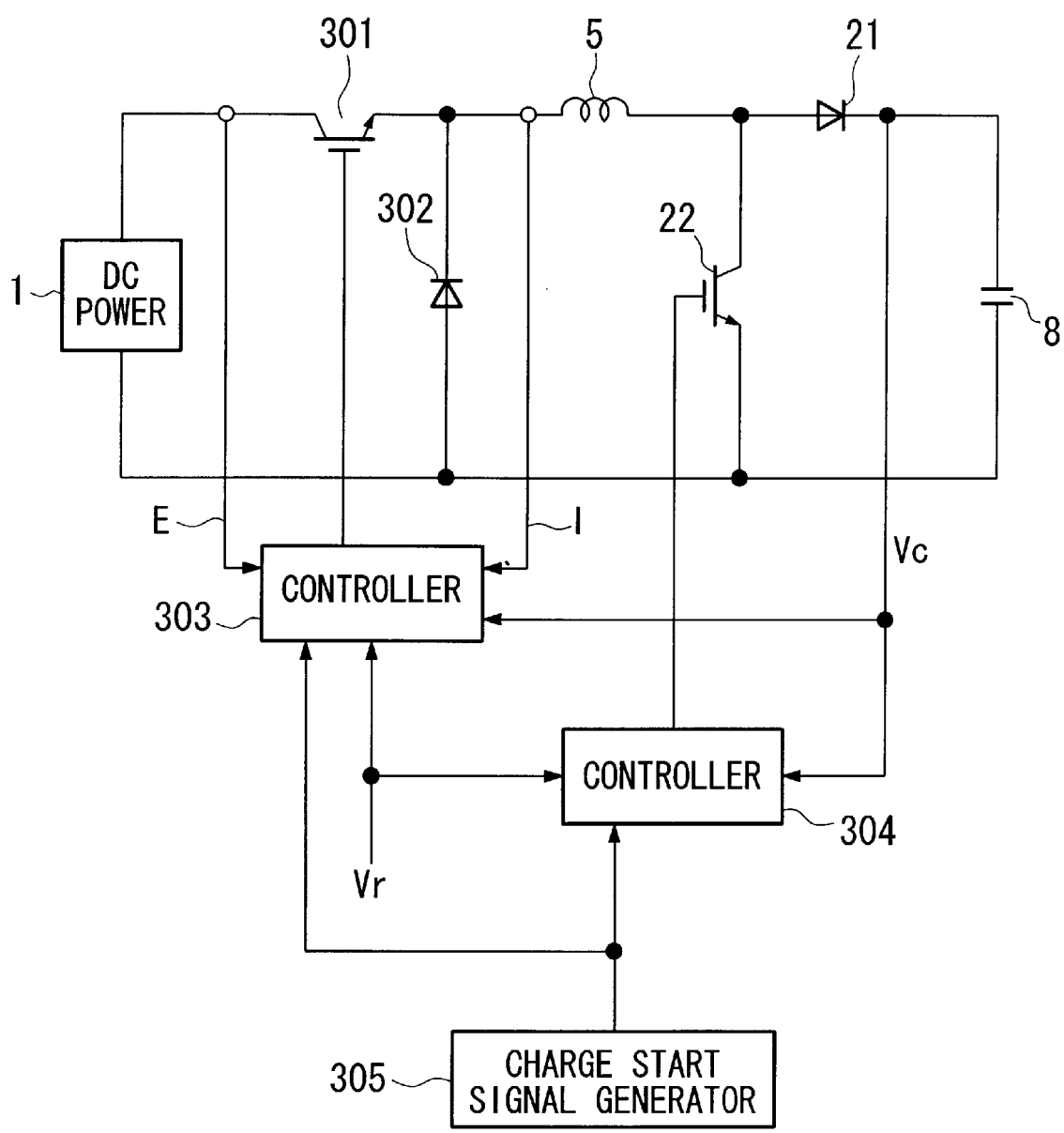
FIG. 18 is a circuit diagram showing the constitution of a resonant charging-type capacitor charging apparatus according to a tenth embodiment of the present invention.

FIG. 18 shows the circuit constitution of the capacitor charging apparatus according to the tenth embodiment. The constitution is based on that of the first embodiment, and uses a switching regulator. The same reference numerals as those in FIG. 1 represent the same components. In FIG. 18, the voltage step-down switching regulator comprises a dc power 1, an IGBT (or another semiconductor switch such as an FET) 301, a diode 302 (a fly-wheel diode), an inductance circuit 5, a load capacitor 8, and a controller 303. With the exception of the controller 303, the circuits of this constitution correspond to the inverter 2, the inverter controller 13, the AND gate 14, the AND gate 15, the transformer 6, and the rectifier 7 shown in FIG. 1.

The controller 303 generates a gate signals for controlling the operation of the IGBT 301, supplying the gate signal to the IGBT 301 based on the output voltage E from the dc power 1, the current I flowing from the IGBT 301 to the inductance circuit 5, the charge voltage Vc of the load capacitor 8, and the reference voltage Vr. The principal concepts of the present invention do not pertain to the function and operation of each of the constituent parts of the switching regulator (e.g. control of the gate signal which the controller 303 supplies to the IGBT 301), which are conventionally known in switching regulator technology and will not be explained in depth here.

A controller 304 corresponds to the circuit comprising the voltage division resistances for detecting charge voltage 9 and 10, the voltage comparator 11, and the pulse generator 23 of FIG. 1. The controller 304 switches the switching element 22 ON and OFF at the same timings as in the first embodiment. A charge start signal generator 305 is, for example, similar to the charge start signal generator 126 shown in FIG. 12, and generates a charge start signal, triggering the controller 303 and the controller 304 to start charging.

The operation of the capacitor charging apparatus according to this embodiment is the same as the first embodiment, and explanation thereof will not be repeated here.

The constitution of the switching regulator is not limited to that shown in FIG. 18, and many conventionally known switching regulator constitutions can be used instead. The technological concept of the embodiment using the switching regulator may be the same as that applied in the first embodiment, and in the embodiments other than the first embodiment.

In the constitution comprising the switching regulator, such as in this embodiment, the dc power 1 comprises a commercial frequency transformer, making the constitution slightly larger than the previous embodiments. Nevertheless, as the capacity increases, this embodiment becomes superior to the other embodiments as regards the cost.

What is claimed is:

1. A capacitor charging apparatus for charging a load capacitor, comprising:

an inductance circuit which provides a resonant current for charging the load capacitor by resonating with the load capacitor; and a switch circuit which cuts off the supply of an inertial current, produced by energy accumulated in the inductance circuit, to the load capacitor at a predetermined timing, the switch circuit being provided on the output side of the inductance circuit.

2. A capacitor charging method for charging a load capacitor, comprising the steps of:

charging the load capacitor with a resonant current, generated by resonating the load capacitor with an inductance circuit which accumulates energy; and bypassing an inertial current, produced by energy accumulated in the inductance circuit, from the load capacitor at a predetermined timing so as to prevent the inertial current from flowing to the load capacitor, using a switch circuit, provided on the output side of the inductance circuit.

3. A capacitor charging apparatus for charging a load capacitor to a set voltage, comprising:

a voltage converter which switches a dc power supply voltage;

an inductance circuit which provides a resonant current for charging the load capacitor by applying the switched dc voltage and resonating with the load capacitor; and a switch circuit which short-circuits the output side of the inductance circuit when the charge voltage of the load capacitor has reached the set voltage so as to prevent an inertial current, produced by electromagnetic energy accumulated in the inductance circuit, from flowing to the load capacitor, the switch circuit being provided on the output side of the voltage converter.

4. The capacitor charging apparatus as described in claim 3, wherein the voltage converter comprises a switching circuit which comprises a semiconductor switching element and a fly-wheel diode.

5. The capacitor charging apparatus as described in claim 3, wherein the voltage converter comprises an inverter which converts the dc power supply voltage to an ac voltage;

a transformer having a primary side which is connected to the ac side of the inverter; and a rectifier which supplies a dc voltage, obtained by rectifying the ac voltage output from the secondary side of the transformer, to the load capacitor;

and the inductance circuit comprises leakage inductance of the transformer, and is connected in series with a primary winding or a secondary winding of the transformer.

6. The capacitor charging apparatus as described in claim 5, further comprising a diode, which is connected in series between the rectifier and the load capacitor, for preventing counter-discharge of the load capacitor;

one end of the switch circuit being connected between the rectifier and the diode, and another end of the switch circuit being connected to a ground side terminal of the rectifier.

7. The capacitor charging apparatus as described in claim 5, further comprising a plurality of diodes which are connected in series between the secondary winding of the transformer so that cathodes thereof are facing each other;

the switch circuit being connected between a connection point of the cathodes of the plurality of diodes and a ground side terminal of the rectifier.

8. The capacitor charging apparatus as described in claim 5, wherein the switch circuit comprises a first switching element, a second switching element, and a resistance, the first switching element being connected in series to the resistance, the second switching element being connected in parallel with the first switching element and the resistance.

9. The capacitor charging apparatus as described in claim 5, wherein
a circuit, formed by connecting a diode and the switch circuit in series, is connected in parallel to the secondary winding of the transformer on the ac side of the rectifier.

10. The capacitor charging apparatus as described in claim 5, wherein
the inverter comprises a resonant charging-type voltage inverter which switches ON during a resonant half-cycle of series resonance generated by the load capacitor and the inductance circuit, and charges the load capacitor equivalently toward a voltage which is twice the dc power supply voltage.

11. The capacitor charging apparatus as described in claim 5, further comprising
a capacitor which is connected in series to the inductance circuit and resonates in series therewith;
the inverter comprising a series resonant-type voltage inverter which operates at a frequency having a predetermined relationship to the resonant frequency of series resonance.

12. The capacitor charging apparatus as described in claim 5, wherein the inverter comprises a switching semiconductor element and a diode for feedback, connected in reverse parallel to the switching semiconductor element, and the inertial current is fed back through the diode for feedback to a dc power which generates the dc power supply voltage.

13. A capacitor charging method for charging a load capacitor to a set voltage, comprising the steps of:
charging the load capacitor by using a voltage converter to switch a dc power supply voltage, and supplying a resonant current to an inductance circuit by using resonance with the load capacitor and application of the dc voltage; and
when the charge voltage of the load capacitor has reached the set voltage, switching OFF the voltage converter and bypassing an inertial current, produced by electromagnetic energy accumulated in the inductance circuit, from the load capacitor so as to prevent the inertial current from flowing to the load capacitor.

14. A capacitor charging method for charging a load capacitor to a set voltage, comprising the steps of:
charging the load capacitor by using a voltage converter to switch a dc power supply voltage, and supplying a resonant current to an inductance circuit by using resonance with the load capacitor and application of the dc voltage;
switching OFF the voltage converter when the charge voltage of the load capacitor has reached a target value, which is lower than the set voltage;
further charging the load capacitor with an inertial current, produced by electromagnetic energy accumulated in the inductance circuit; and
when the charge voltage of the load capacitor has reached the set voltage, switching ON a switch circuit, provided on the output side of the voltage converter, bypassing the inertial current from the load capacitor and so as to prevent the inertial current from flowing the load capacitor.

15. The capacitor charging method as described in claim 14, wherein, when the switch circuit turns ON, an inertial current produced by the inductance circuit is fed back to the dc power side, which generates the dc power supply voltage.

16. The capacitor charging method as described in claim 14, wherein the switch circuit is kept ON until the inertial current becomes approximately zero.

17. The capacitor charging method as described in claim 14, further comprising the steps of:
sequentially switching ON a plurality of switching semiconductor element, provided in the inverter forming the voltage converter, and
switching OFF the switch circuit immediately after the next switching semiconductor element has switched ON.

18. A capacitor charging method for charging a load capacitor to a set voltage, comprising the steps of:
charging the load capacitor by using a voltage converter to convert an applied dc power supply voltage to a predetermined dc voltage, and supplying a resonant current to an inductance circuit by using resonance with the load capacitor and application of the dc voltage;
calculating a boost in charge voltage of the load capacitor by prediction within in an operating delay td from generating a charge stop command and the actual stop of charging, and stopping charging of the load capacitor by generating the charge stop command in anticipation of the boost in charge voltage; and
short-circuiting the output side of the inductance circuit by switching ON a switch circuit, provided on the output side of the voltage converter, preventing an inertial current, produced by electromagnetic energy which has accumulated in the inductance circuit, to the load capacitor.

19. The capacitor charging method as described in claim 18, comprising
detecting the charge voltage of the load capacitor as a charge voltage detect signal Vd;
calculating (Vd+td×dVd/dt) based on the charge voltage detect signal Vd and the operating delay td, and, when (Vd+td×dVd/dt)=a predetermined reference voltage Vf, generating the charge stop command and switching ON the switch circuit.

20. A capacitor charging apparatus which charges a load capacitor to a set voltage, comprising:
a voltage converter which switches a dc power supply voltage;
an inductance circuit which supplies a resonant current for charging the load capacitor by using resonance with the load capacitor and application of the dc voltage;
a switch circuit which is provided on the output side of the voltage converter and, when switched ON, short-circuits the output side of the inductance circuit so as to prevent an inertial current, produced by electromagnetic energy which has accumulated in the inductance circuit, to the load capacitor;
an ON signal generator which generates an ON signal for switching ON the switch circuit in compliance with a charge stop command; and
an arithmetic circuit which calculates the charge voltage boost of the load capacitor during the operating delay between the generating of the ON signal by the ON signal generator and the stopping of charging as a result of the switch circuit switching ON, and transmits the charge stop command to the ON signal generator in anticipation of the charge voltage boost.

21. A capacitor charging apparatus which charges a load capacitor to a set voltage, comprising:
- a voltage converter which switches a dc power supply voltage;
- an inductance circuit which supplies a resonant current for charging the load capacitor by using resonance with the load capacitor and application of the dc voltage;
- a switch circuit which is provided on the output side of the voltage converter and, when switched ON, short-circuits the output side of the inductance circuit so as to prevent an inertial current, produced by electromagnetic energy which has accumulated in the inductance circuit, to the load capacitor;
- an ON signal generator which generates an ON signal for switching ON the switch circuit in compliance with a charge stop command; and
- a charge voltage detector which detects the charge voltage of the load capacitor as a charge voltage detect signal Vd; and
- an arithmetic circuit which calculates (Vd+td×dVd/dt) based on the charge voltage detect signal Vd and an operating delay td relating to the switch circuit, and, when (Vd+td×dVd/dt)=a predetermined reference voltage Vr, transmits the charge stop command to the ON signal generator.

22. A method for charging a load capacitor in stages comprising:
- a first step of charging the load capacitor to a predetermined voltage by supplying a resonant current, generated by resonance of an inductance circuit and a resonant capacity, from a power;
- a second step of cutting-off the resonant current to the load capacitor, and simultaneously maintaining the energy accumulated in the inductance circuit while circulating the energy;
- a third step of again charging the load capacitor to a set voltage, which is set in each charge cycle and is determined in consideration of load conditions, by supplying the resonant current to the load capacitor via the inductance circuit from the power; and
- a fourth step of again cutting-off the resonant current to the load capacitor, and simultaneously discharging the energy accumulated in the inductance circuit.

23. The capacitor charging method as described in claim 22, wherein the first and second steps are performed during the time taken to calculate a variable reference voltage, which corresponds to the calculated set voltage, in the third step.

24. The capacitor charging method as described in claim 22, wherein the energy, which has been discharged from the inductance circuit in the fourth step, is fed back to the power.

25. The capacitor charging method as described in claim 22, wherein an inertial current, generated by the energy discharged from the inductance circuit in the fourth stage, is bypassed so as not to flow to the load capacitor and over-charge the load capacitor.

26. A capacitor charging apparatus which charges a load capacitor to a set voltage in stages, comprising:
- an inductance circuit which supplies a resonant current for charging the load capacitor by using resonance with the load capacitor and application of a predetermined dc voltage;
- a voltage converter which switches a dc power supply voltage, and is provided with a feedback circuit which, during a predetermined period, circulates energy, which has accumulated in the inductance circuit, while feeding back the energy to a dc power which generates the dc power supply voltage;
- a switch circuit which shuts off an inertial current, produced by the energy which has accumulated in the inductance circuit, from the load capacitor;
- a comparator which compares a reference voltage, set to a predetermined constant reference voltage or a variable reference voltage which is calculated from load conditions after each charge cycle, with the charge voltage of the load capacitor;
- a controller which firstly charges the load capacitor to an intermediate voltage corresponding to the constant reference voltage based on the comparison result from the comparator, and then stops the charging of the load capacitor, circulates the current of the inductance circuit by using the feedback circuit, and subsequently sets the variable reference voltage as the reference voltage, switches OFF the switch circuit and restarts the charging of the load capacitor, charges the load capacitor to the set voltage based on the comparison result of the comparator, and then, switches ON the switch circuit and bypasses the inertial current from the load capacitor.

27. The capacitor charging apparatus as described in claim 26, wherein
- the voltage converter comprises a circuit formed by connecting a first semiconductor switch, the inductance circuit, the primary winding of a transformer, and a second semiconductor switch, in series with the dc power; the feedback circuit which circulates the energy accumulated in the inductance circuit while feeding the energy back to the dc power during the period when the first and second semiconductor switches are OFF, and a rectifier which supplies a rectified dc voltage obtained by rectifying an ac voltage in the secondary winding of the transformer to the load capacitor;
- the voltage converter charging the load capacitor by switching ON the first and second semiconductor switches so as to electrically connect the load capacitor to the dc power; and
- switching OFF at least one of the first and second semiconductor switches so as to shut off the load capacitor from the dc power and stopping the charging, and in addition, circulating the current of the inductance circuit.

28. The capacitor charging apparatus as described in claim 27, wherein
- the first and second semiconductor switches each comprise a bridge inverter comprised of a pair of semiconductor switches, connected in series; and
- the controller operates the first and second semiconductor switches in opposite phase.

29. The capacitor charging apparatus as described in claim 27, wherein
- the third semiconductor switch is provided on the secondary winding side of the transformer.

30. A capacitor charging method for charging a load capacitor to a target voltage, comprising the steps of:
- using a main charger to convert an applied dc power supply voltage to a predetermined dc voltage, and charging the load capacitor by supplying a resonant current, generated by resonance with the load capacitor and application of the dc voltage, to the inductance circuit;

stopping the charging of the load capacitor by using the main charger to generate a charge stop command when the charge voltage of the load capacitor has reached a predetermined voltage near the target voltage, and preventing an inertial current, produced by energy which has accumulated in the inductance circuit, from flowing to the load capacitor by short-circuiting the output side of the inductance circuit by using a bypass switch circuit; and circuit thereafter, using an auxiliary charger, which is connected in parallel to the main charger, to charge to 100% of the target voltage and auxiliarily charge the discharge of the load capacitor.

31. The capacitor charging method as described in claim 30, wherein the predetermined voltage is greater than 99% of the target voltage.

32. A capacitor charging apparatus which charges a load capacitor to a target voltage, comprising:

a main charger comprising a voltage converter which converts a dc power supply voltage to a predetermined dc voltage, an inductance circuit which supplies a resonant current for charging the load capacitor by using resonance with the load capacitor and application of the predetermined dc voltage, and a bypass switch circuit which short-circuits the output side of the inductance circuit by using a charge stop command, and prevents an inertial current, produced by electromagnetic energy of the inductance circuit, from flowing to the load capacitor, the bypass switch circuit being provided on the output side of the voltage converter; and an auxiliary charger which is connected in parallel with the main charger;

the main charger charging the load capacitor, and generating a charge stop command when the charge voltage of the load capacitor has reached a predetermined voltage near the target voltage, shutting off the load capacitor from the electromagnetic energy of the inductance circuit by using the bypass switch circuit; and the auxiliary charger charging to 100% of the target voltage and auxiliarily charging the discharge of the load capacitor.

33. The capacitor charging apparatus as described in claim 32, wherein the predetermined voltage is greater than 99% of the target voltage.

34. The capacitor charging apparatus as described in claim 32, wherein the auxiliary charger comprises a high-frequency converter-type capacitor charger having power capacity of 2% to 9% of the power capacity of the main charger.

35. The capacitor charging apparatus as described in claim 32, wherein the auxiliary charger comprises a high-frequency converter-type capacitor charger having power capacity of preferably 4% to 5% of the power capacity of the main charger.

36. The capacitor charging apparatus as described in claim 32, wherein the main charger comprises a resonant charger wherein the inductance circuit and the load capacitor resonate.

37. The capacitor charging apparatus as described in claim 32, wherein the auxiliary charger comprises a high-frequency converter-type circuit which uses a series resonant system or a parallel resonant system.

38. The capacitor charging apparatus as described in claim 32, wherein the voltage converter comprises an inverter which converts a dc power voltage to an ac voltage, a transformer having a primary side which is connected to the ac side of the inverter, and a rectifier which supplies a dc voltage, obtained by rectifying the ac voltage output from a secondary side of the transformer, to the load capacitor;

the inductance circuit comprises leakage inductance of the transformer, and is connected in series to the primary winding or secondary winding of the transformer; and the bypass switch circuit is provided on the secondary side of the transformer.

* * * * *